United States Patent
Hong et al.

(10) Patent No.: US 6,633,655 B1
(45) Date of Patent: Oct. 14, 2003

(54) METHOD OF AND APPARATUS FOR DETECTING A HUMAN FACE AND OBSERVER TRACKING DISPLAY

(75) Inventors: Qi He Hong, Oxfordshire (GB); Nicolas Steven Holliman, Oxfordshire (GB); David Ezra, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/386,527

(22) Filed: Aug. 30, 1999

(30) Foreign Application Priority Data

Sep. 5, 1998 (GB) ............................................. 9819323

(51) Int. Cl.[7] .............................................. G06K 9/00
(52) U.S. Cl. ....................... 382/118; 382/164; 382/165; 382/174; 382/206
(58) Field of Search .................................. 382/118, 174, 382/164, 165, 206

(56) References Cited

U.S. PATENT DOCUMENTS

| | | | |
|---|---|---|---|
| 5,629,752 A | 5/1997 | Kinjo et al. ................... 355/35 |
| 5,680,481 A | 10/1997 | Prasad et al. ................ 382/190 |
| 5,715,325 A | 2/1998 | Bang et al. ................... 382/118 |
| 5,835,616 A | 11/1998 | Lobo et al. ................... 382/118 |
| 5,870,138 A | * 2/1999 | Smith et al. ................. 348/143 |
| 6,088,137 A | * 7/2000 | Tomizawa .................... 358/520 |
| 6,148,092 A | * 11/2000 | Qian ........................... 382/118 |
| 6,389,155 B2 | * 5/2002 | Funayama et al. ........... 345/620 |
| 6,404,900 B1 | * 6/2002 | Qian et al. ................... 348/169 |

FOREIGN PATENT DOCUMENTS

| | | |
|---|---|---|
| EP | 751473 | 2/1997 |
| EP | 0844582 A2 | 5/1998 |
| WO | 9629674 | 9/1996 |
| WO | 9825229 | 6/1998 |

OTHER PUBLICATIONS

Wu et al., "Face and Facial Feature Extraction from Color Image." Proc. of the Second Int. Conf. on Automatic Face and Gestur Recognition, Oct. 1996, pp. 345–350).*

Reisfeld et al. "Robust Detection of Facial Features by Generalized Symmetry." Proc. 11th IAPR, Int. Conf. on Computer Vision and Applications, Conference A, vol. 1, Aug. 1992, pp. 117–120.*

(List continued on next page.)

Primary Examiner—Jon Chang
(74) Attorney, Agent, or Firm—Renner, Otto, Boisselle & Sklar

(57) ABSTRACT

A method is provided for detecting a human face in an image, such as a sequence of images supplied by a video camera. The method comprises locating in each image a candidate face region and analyzing the candidate face region for a first characteristic indicative of a facial feature. The locating step may comprise detecting uniformity saturated regions of predetermined shape in a reduced resolution version of the image. The analyzing step may comprise selecting a signal color component, forming a vertical integral projection profile and detecting an omega shape in the profile characteristic of an eye region of a face.

41 Claims, 27 Drawing Sheets

OTHER PUBLICATIONS

Brunelli et al., "Face Recognition: Features versus Templates." IEEE Trans. on Pattern Analysis and Machine Intelligence, vol. 15, No. 10, Oct. 1993, pp. 1042–1052.*

Sobottka et al. "Segmentation and Tracking of Faces in Color Images." Proc. of the Second Int. Conf. on Automatic Face and Gesture Recognition, Oct. 1996, pp. 236–241.*

Peng et al. "Locating Facial Features Using Threshold Images." 3rd Int. Conf. on Signal Processing, Oct. 1996, pp. 1162–1166.*

Crowley et al. "Multi–Modal Tracking of Faces for Video Communications." Proc. IEEE Computer Society Conf. on Computer Vision and Pattern Recognition, Jun. 1997, pp. 640–645.*

Herodotou et al. "A color Segmentation Scheme for Object-–Based Video Coding."IEEE Symp. on Advance in Digital Filtering an Signal Processing, Jun. 1998, pp. 25–29.*

Search Report for British Patent Application No. 9819323.8 dated Jan. 15, 1999.

G. Yang et al., Pattern Recognition, vol. 27, No. 1, pp 53–63, 1994, "Human Face Detection in Complex Backgrounds."

M. Turk and A. Pentland, Journal of Cognitive Neuroscience, vol. 3, No. 1, pp. 70–86, "Eigenfaces for Recognition."

Sako et al., proceedings of 12 IAPR International Conference on Pattern Recognition. Jerusalem, Oct. 6–13, 1994, vol. II, pp. 320–324, "Real Time Facial Feature Tracking Based on Matching Techniques and its Applications."

Chen et al., IEEE (0–8186–7042–8), pp. 591–596, 1995, "Face Detection by Fuzzy Pattern Matching."

European Search Report for EP Application 99306962.4–2201 mailed Jan. 28, 2000.

* cited by examiner

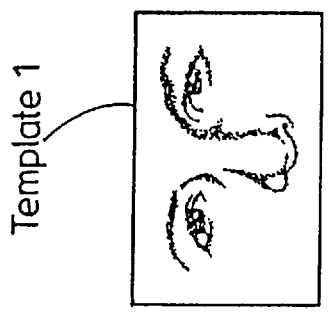
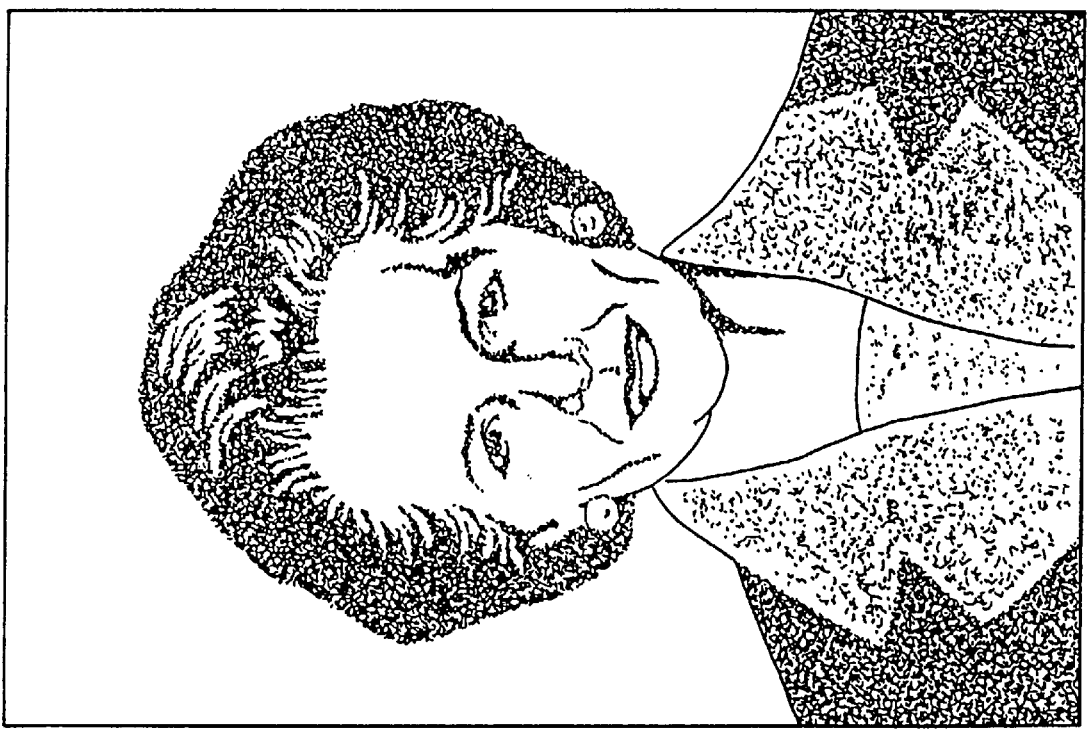
FIG. 4

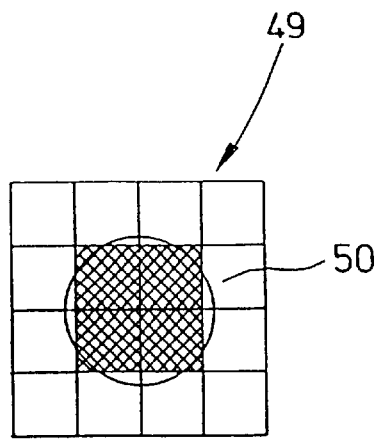
FIG. 12A
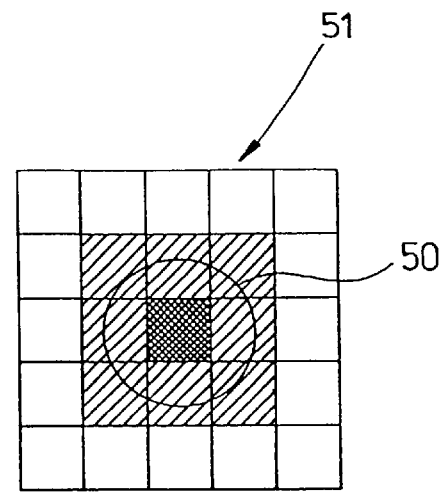
FIG. 12B
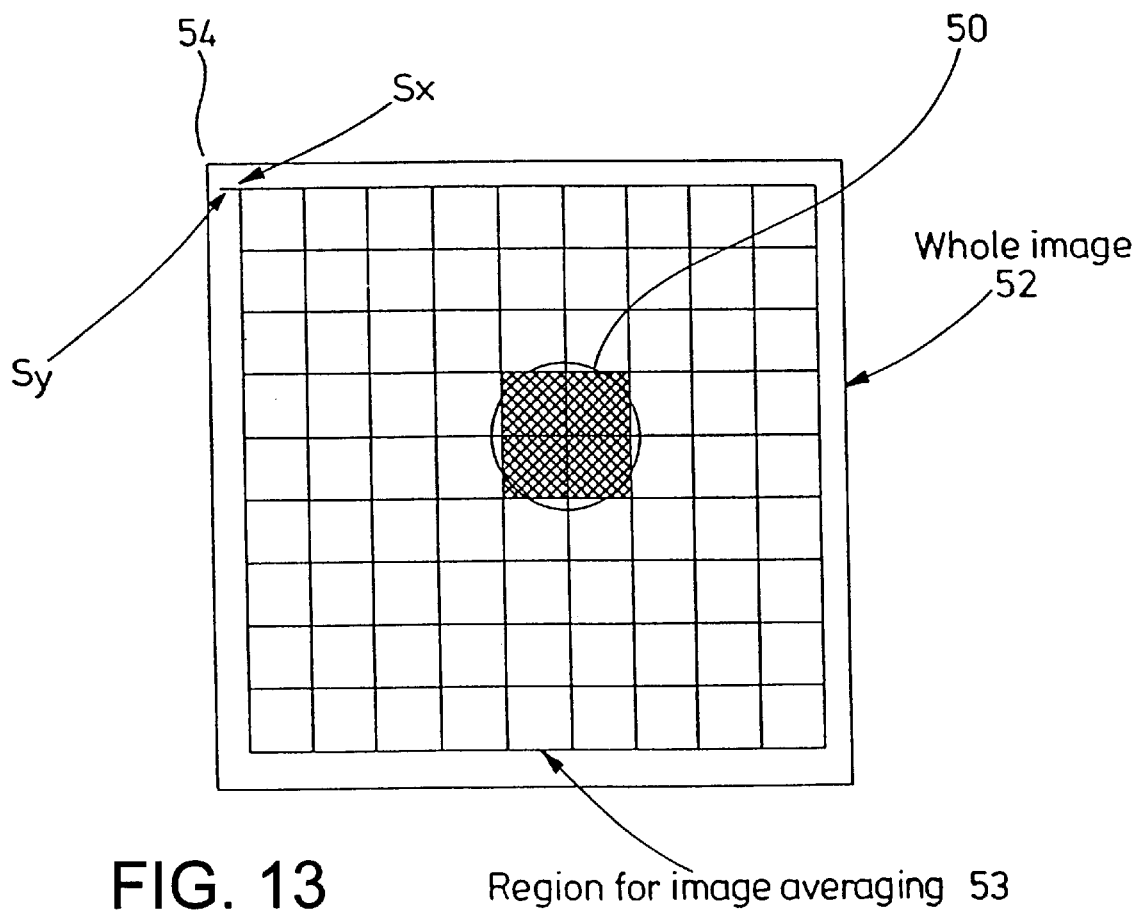
FIG. 13   Region for image averaging 53

21
Target image size
k by l pixels

METHOD OF AND APPARATUS FOR DETECTING A HUMAN FACE AND OBSERVER TRACKING DISPLAY

BACKGROUND OF THE INVENTION

The present invention relates to a method of and an apparatus for detecting a human face. Such a method may, for example, be used for capturing a target image in an initialisation stage of an image tracking system. The present invention also relates to an observer tracking display, for instance of the autostereoscopic type, using an image tracking system including such an apparatus.

Other applications of such methods and apparatuses include security surveillance, video and image compression, video conferencing, multimedia database searching, computer games, driver monitoring, graphical user interfaces, face recognition and personal identification.

Autostereoscopic displays enable a viewer to see two separate images forming a stereoscopic pair by viewing such displays with the eyes in two viewing windows. Examples of such displays are disclosed in EP 0 602 934, EP 0 656 555, EP 0 708 351, EP 0 726 482 and EP 0 829 743. An example of a known type of observer tracking autostereoscopic display is illustrated in FIG. 1 of the accompanying drawings.

The display comprises a display system 1 co-operating with a tracking system 2. The tracking system 2 comprises a tracking sensor 3 which supplies a sensor signal to a tracking processor 4. The tracking processor 4 derives from the sensor signal an observer position data signal which is supplied to a display control processor 5 of the display system 1. The processor 5 converts the position data signal into a window steering signal and supplies this to a steering mechanism 6 of a tracked 3D display 7. The viewing windows for the eyes of the observer are thus steered so as to follow movement of the head of the observer and, within the working range, to maintain the eyes of the observer in the appropriate viewing windows. GB 2 324 428 and EP 0 877 274 disclose an observer video tracking system which has a short latency time, a high update frequency and adequate measurement accuracy for observer tracking autostereoscopic displays. FIG. 2 of the accompanying drawings illustrates an example of the system, which differs from that shown in FIG. 1 of the accompanying drawings in that the tracking sensor 3 comprises a Sony XC999 NTSC video camera operating at a 60 Hz field rate and the tracking processor 4 is provided with a mouse 8 and comprises a Silicon Graphics entry level machine of the Indy series equipped with an R4400 processor operating at 150 Mhz and a video digitiser and frame store having a resolution of 640×240 picture elements (pixels) for each field captured by the camera 3. The camera 3 is disposed on top of the display 7 and points towards the observer who sits in front of the display. The normal distance between the observer and the camera 3 is about 0.85 metres, at which distance the observer has a freedom of movement in the lateral or X direction of about 450mm. The distance between two pixels in the image formed by the camera corresponds to about 0.67 and 1.21 mm in the X and Y directions, respectively. The Y resolution is halved because each interlaced field is used individually.

FIG. 3 of the accompanying drawings illustrates in general terms the tracking method performed by the processor 4. The method comprises an initialisation stage 9 followed by a tracking stage 10. During the initialisation stage 9, a target image or "template" is captured by storing a portion of an image from the camera 3. The target image generally contains the observer eye region as illustrated at 11 in FIG. 4 of the accompanying drawings. Once the target image or template 11 has been successfully captured, observer tracking is performed in the tracking stage 10.

A global target or template search is performed at 12 so as to detect the position of the target image within the whole image produced by the camera 3. Once the target image has been located, motion detection is performed at 13 after which a local target or template search is performed at 14. The template matching steps 12 and 14 are performed by cross-correlating the target image in the template with each sub-section overlaid by the template. The best correlation value is compared with a predetermined threshold to check whether tracking has been lost in step 15. If so, control returns to the global template matching step 12. Otherwise, control returns to the step 13. The motion detection 13 and the local template matching 14 form a tracking loop which is performed for as long as tracking is maintained. The motion detection step supplies position data by a differential method which determines the movement of the target image between consecutive fields and adds this to the position found by local template matching in the preceding step for the earlier field.

The initialisation stage 9 obtains a target image or a template of the observer before tracking starts. The initialisation stage disclosed in GB 2 324 428 and EP 0 877 274 uses an interactive method in which the display 7 displays the incoming video images and an image generator, for example embodied in the processor 4, generates a border image or graphical guide 16 on the display as illustrated in FIG. 5 of the accompanying drawings. A user-operable control, for instance forming part of the mouse 8, allows manual actuation of capturing of the image region within the border image.

The observer views his own image on the display 7 together with the border image which is of the required template size. The observer aligns the midpoint between his eyes with the middle line of the graphical guide 16 and then activates the system to capture the template, for instance by pressing a mouse button or a keyboard key. Alternatively, this alignment may be achieved by dragging the graphical guide 16 to the desired place using the mouse 8.

An advantage of such an interactive template capturing technique is that the observer is able to select the template with acceptable alignment accuracy. This involves the recognition of the human face and the selection of the interesting image regions, such as the eyes regions. Whereas human vision renders this process trivial, such template capture would be difficult for a computer, given all possible types of people with different age, sex, eye shape and skin colour under various lighting conditions.

However, such an interactive template capturing method is not convenient for regular users because template capture has to be performed for each use of the system. For non-regular users, such as a visitor, there is another problem in that they have to learn how to cooperate with the system. For example, new users may need to know how to align their faces with the graphical guide. This alignment is seemingly intuitive but has been found awkward for many new users. It is therefore desirable to provide an improved arrangement which increases the ease of use and market acceptability of tracking systems.

In order to avoid repeated template capture for each user, it is possible to store each captured template of the users in a database. When a user uses the system for the first time, the interactive method may be used to capture the template, which is then stored in the database. Subsequent uses by the same user may not require a new template as the database can be searched to find his or her template. Each user may need to provide more than one template to accommodate, for example, changes of lighting and changes of facial features. Thus, although this technique has the advantage of avoiding the need to capture a template for each use of the display, it is only practical if the number of users is very small. Otherwise, the need to build a large database and the associated long searching time would become prohibitive for any commercial implementation. For example, point-of-sale systems with many one-time users would not easily be able to store a database with every user.

It is possible to capture templates automatically using image processing and computer vision techniques. This is essentially a face and/or eye detection problem, which forms part of a more general problem of face recognition. A complete face recognition system should be able to detect faces automatically and identify a person from each face. The task of automatic face detection is different from that of identification, although many methods which are used for identification may also be used for detection and vice versa.

Much of the computer vision research in the field of face recognition has focused so far on the identification task and examples of this are disclosed in R Brunelli and T Poggio, "Face recognition through geometrical feature," Proceedings of the 2$^{nd}$ European Conference on Computer Vision, pp. 792–800, Genoa, 1992; U.S. Pat. No. 5,164,992A, M Turk and A Pentland, "Eigenfaces for recognition," Journal of Cognitive Neuroscience Vol 3, No 1, pp. 70–86 and A L Yuille, D S Cohen, and P W Hallinam, "Feature extraction from faces using deformable templates," International Journal of Computer Vision, 8(2), pp. 99–111 1992. Many of these examples have shown a clear need for automatic face detection but the problem and solution tend to be ignored or have not been well described. These known techniques either assume that a face is already detected and that its position is known in an image or limit the applications to situations where the face and the background can be easily separated. Few known techniques for face detection achieve a reliable detection rate without restrictive constraints and long computing time.

DE 19634768 discloses a method of detecting a face in a video picture. The method compares an input image with a pre-stored background image to produce a binary mask which can be used to locate the head region, which is further analysed with regard to the possibility of the presence of a face. This method requires a controlled background which does not change. However, it is not unusual for people to move around in the background while one user is watching an autostereoscopic display.

G Yang and T S Huang, "Human face detection in complex backgrounds", Pattern Recognitition, Vol. 27, No. 1, pp. 53–63, 1994 disclose a method of locating human faces in an uncontrolled background using a hierarchical knowledge-based technique. The method comprises three levels. The higher two levels are based on mosaic images at different resolutions. In the lowest level, an edge detection method is proposed. The system can locate unknown human faces spanning a fairly wide range of sizes in a black-and-white picture. Experimental results have been reported using a set of 40 pictures as the training set and a set of 60 pictures as the test set. Each picture has 512×512 pixels and allows for face sizes ranging from 48×60 to 200×250 pixels. The system has achieved a detection rate of 83% i.e. 50 out of 60.

In addition to correctly located faces, false faces were detected in 28 pictures of the test set. While this detection rate is relatively low, a bigger problem is the computing time of 60 to 120 seconds for processing each image.

U.S. Pat. No. 5,012,522 discloses a system which is capable of locating human faces in video scenes with random content within two minutes and of recognising the faces which it locates. When an optional motion detection feature is included, the location and recognition events occur in less than 1 minute. The system is based on an earlier autonomous face recognition machine (AFRM) disclosed in E J Smith, "Development of autonomous face recognition machine", Master thesis, Doc.# AD-A178852, Air Force Institute of Technology, December 1986, with improved speed and detection score. The AFRM was developed from an earlier face recognition machine by including an automatic "face finder", which was developed using Cortical Thought Theory (CTT). CTT involves the use of an algorithm which calculates the "gestalt" of a given pattern. According to the theory, the gestalt represents the essence or "single characterisation" uniquely assigned by the human brain to an entity such as a two-dimensional image. The face finder works by searching an image for certain facial characteristics or "signatures". The facial signatures are present in most facial images and are rarely present when no face is present.

The most important facial signature in the AFRM is the eye signature, which is generated by extracting columns from an image and by plotting the results of gestalt calculated for each column. First an 8 pixel (vertical) by 192 pixel (horizontal) window is extracted from a 128 by 192 pixel image area. The 8 by 192 pixel window is then placed at the top of a new 64 by 192 pixel image. The remaining rows of the 64 by 192 pixel image are filled in with a background grey level intensity, for instance 12 out of the total of 16 grey levels where 0 represents black. The resulting image is then transformed into the eye signature by calculating the gestalt point for each of the 192 vertical columns in the image. This results in a 192-element vector of gestalt points. If an eye region exists, this vector shows a pattern that is characterised by two central peaks corresponding to the eye centres and a central minimum between the two peaks together with two outer minima on either side. If such a signature is found, an eye region may exist. A similar technique is then applied to produce a nose/mouth signature to verify the existence of the face. The AFRM achieved a 94% success rate for the face finder algorithm using a small image database containing 139 images (about 4 to 5 different pictures per subject). A disadvantage of such a system is that there are too many objects in an image which can display a similar pattern. It is not, therefore, a very reliable face locator. Further, the calculation of the gestalts is very computing intensive so that it is difficult to achieve real time implementation.

EP 0 751 473 discloses a technique for locating candidate face regions by filtering, convolution and thresholding. A subsequent analysis checks whether candidate face features, particularly the eyes and the mouth, have certain characteristics.

U.S. Pat. No. 5,715,325 discloses a technique involving reduced resolution images. A location step compares an image with a background image to define candidate face regions. Subsequent analysis is based on a three level brightness image and is performed by comparing each candidate region with a stored template.

U.S. Pat. No. 5,629,752 discloses a technique in which analysis is based on locating body contours in an image and checking for symmetry and other characteristics of such contours. This technique also checks for horizontally symmetrical eye regions by detecting horizontally symmetrical dark ellipses whose major axes are oriented symmetrically.

Sako et al, Proceedings of 12 IAPR International Conference on Pattern Recognition, Jerusalem 6–13 October 1994, Vol. 11, pp. 320–324, "Real Time Facial Feature Tracking Based on Matching Techniques and its Applications" discloses various analysis techniques including detection of eye regions by comparison with a stored template.

Chen et al, IEEE (0-8186-7042-8) pp. 591–596, 1995, "Face Dtection by Fuzzy Pattern Matching" performs candidate face location by fuzzy matching to a "face model". Candidates are analysed by checking whether eye/eyebrow and nose/mouth regions are present on the basis of an undefined "model".

BRIEF SUMMARY OF THE INVENTION

According to a first aspect of the invention, there is provided a method of detecting a human face in an image, comprising locating in the image a candidate face region and analysing the candidate face region for a first characteristic indicative of a facial feature, characterised in that the first characteristic comprises a substantially symmetrical horizontal brightness profile comprising a maximum disposed between first and second minima and in that the analysing step comprises forming a vertical integral projection of a portion of the candidate face region and determining whether the vertical integral projection has first and second minima disposed substantially symmetrically about a maximum.

The locating and analysing steps may be repeated for each image of a sequence of images, such as consecutive fields or frames from a video camera.

The or each image may be a colour image and the analysing step may be performed on a colour component of the colour image.

The analysing step may determine whether the vertical integral projection has first and second minima whose horizontal separation is within a predetermined range.

The analysing step may determine whether the vertical integral projection has a maximum and first and second minima such that the ratio of the difference between the maximum and the smaller of the first and second minima to the maximum is greater than a first threshold.

The vertical integral projection may be formed for a plurality of portions of the face candidate and the portion having the highest ratio may be selected as a potential target image.

The analysing step may comprise forming a measure of the symmetry of the portion.

The symmetry measure may be formed as:

$$\sum_{x=0}^{x_0} |V(x_0 + x) - V(x_0 - x)|$$

Where V (x) is the value of the vertical integral projection at horizontal position x and $x_0$ is the horizontal position of the middle of the vertical integral projection.

The vertical integral projection may be formed for a plurality of portions of the face candidate and the portion having the highest symmetry measure may be selected as a potential target image.

The analysing step may comprise dividing a portion of the candidate face region into left and right halves, forming a horizontal integral projection of each of the halves, and comparing a measure of horizontal symmetry of the left and right horizontal integral projections with a second threshold.

The analysing step may determine whether the candidate face region has first and second brightness minima disposed at substantially the same height with a horizontal separation within a predetermined range.

The analysing step may determine whether the candidate face region has a vertically extending region of higher brightness than and disposed between the first and second brightness minima.

The analysing step may determine whether the candidate face region has a horizontally extending region disposed below and of lower brightness than the vertically extending region.

The analysing step may comprise locating, in the candidate face region, candidate eye pupil regions where a green image component is greater than a red image component or where a blue image component is greater than a green image component. Locating the candidate eye pupil regions may be restricted to candidate eye regions of the candidate face region. The analysing step may form a function E(x,y) for picture elements (x,y) in the candidate eye regions such that:

$$E(x, y) = \begin{cases} 0 & \text{for } R - G > C_1 \text{ and } G - B > C_2 \\ 1 & \text{otherwise} \end{cases}$$

where R, G and B are red, green and blue image components, $C_1$ and $C_2$ are constants, E(x,y)=1 represents a picture element inside the candidate eye pupil regions and E(x,y)=0 represents a picture element outside the candidate eye pupil regions. The analysing step may detect the centres of the eye pupils as the centroids of the candidate eye pupil regions.

The analysing step may comprise locating a candidate mouth region in a sub-region of the candidate face region which is horizontally between the candidate eye pupil regions and vertically below the level of the candidate eye pupil regions by between substantially half and substantially one and half times the distance between the candidate eye pupil regions. The analysing step may form a function M(x,y) for picture elements (x,y) within the sub-regions such that:

$$M(x, y) = \begin{cases} 0 & \text{for } R > G > B \text{ and } R < \eta G \\ 1 & \text{otherwise} \end{cases}$$

where R, G and B are red, green and blue image components, Ti is a constant, M(x,y)=1 represents a picture element inside the candidate mouth region and M(x,y)=0 represents a picture element outside the candidate mouth region. Vertical and horizontal projection profiles of the function M(x,y) may be formed and a candidate lip region may be defined in a rectangular sub-region where the vertical and horizontal projection profiles exceed first and second predetermined thresholds, respectfully. The first and second predetermined thresholds may be proportional to maxima of the vertical and horizontal projection profiles, respectively.

The analysing step may check whether the aspect ratio of the candidate lip region is between first and second predefined thresholds.

The analysing step may check whether the ratio of the vertical distance from the candidate eye pupil regions to the top of the candidate lip region to the spacing between the candidate eye pupil regions is between first and second preset thresholds.

The analysing step may comprise dividing a portion of the candidate face region into left and right halves and comparing the angles of the brightness gradients of horizontally symmetrically disposed pairs of points for symmetry.

The locating and analysing steps may be stopped when the first characteristic is found r times in R consecutive images of the sequence.

The locating step may comprise searching the image for a candidate face region having a second characteristic indicative of a human face.

The second characteristic may be uniform saturation.

The searching step may comprise reducing the resolution of the image by averaging the saturation to form a reduced resolution image and searching for a region of the reduced resolution image having, in a predetermined shape, a substantially uniform saturation which is substantially different from the saturation of the portion of the reduced resolution image surrounding the predetermined shape.

The image may comprise a plurality of picture elements and the resolution may be reduced so that the predetermined shape is from two to three reduced resolution picture elements across.

The image may comprise a rectangular array of M by N picture elements, the reduced resolution image may comprise (M/m) by (N/n) picture elements, each of which corresponds to m by n picture elements of the image, and the saturation of each picture element of the reduced resolution image may be given by:

$$P = (1/mn) \sum_{i=0}^{m-1} \sum_{j=0}^{n-1} f(i, j)$$

where f (i,j) is the saturation of the picture element of the ith column and the jth row of the m by n picture elements.

The method may comprise storing the saturations in a store.

A uniformity value may be ascribed to each of the reduced resolution picture elements by comparing the saturation of each of the reduced resolution picture elements with the saturation of at least one adjacent reduced resolution picture element.

Each uniformity value may be ascribed a first value if $$(\max(P)-\min(P))/\max(P) \leq T$$

where max(P) and min(P) are the maximum and minimum values, respectively, of the saturations of the reduced resolution picture element and the or each adjacent picture element and T is a threshold, and a second value different from the first value otherwise.

T maybe substantially equal to 0.15.

The or each adjacent reduced resolution picture element may not have been ascribed a uniformity value and each uniformity value may be stored in the store in place of the corresponding saturation.

The resolution may be reduced such that the predetermined shape is two or three reduced resolution picture elements across and the method may further comprise indicating detection of a candidate face region when a uniformity value of the first value is ascribed to any of one reduced resolution picture element, two vertically or horizontally adjacent reduced resolution picture elements and a rectangular two-by-two array of picture elements and when a uniformity value of the second value is ascribed to each surrounding reduced resolution picture element.

Detection may be indicated by storing a third value different from the first and second values in the store in place of the corresponding uniformity value.

The method may comprise repeating the resolution reduction and searching at least once with the reduced resolution picture elements shifted with respect to the image picture elements.

The saturation may be derived from red, green and blue components as $$(\max(R,G,B)-\min(R,G,B))/\max(R,G,B)$$

where max(R,G,B) and min(R,G,B) are the maximum and minimum values, respectively, of the red, green and blue components.

A first image may be captured while illuminating an expected range of positions of a face, a second image may be captured using ambient light, and the second image may be subtracted from the first image to form the image.

According to a second aspect of the invention, there is provided an apparatus for detecting a human face in an image, comprising means for locating in the image a candidate face region and means for analysing the candidate face region for a first characteristic indicative of a facial feature.

According to a third aspect of the invention, there is provided an observer tracking display including an apparatus according to the second aspect of the invention.

It is thus possible to provide a method of and an apparatus for automatically detecting a human face in, for example, an incoming video image stream or sequence. This may be used, for example, to replace the interactive method of capturing a template as described hereinbefore and as disclosed in GB 2 324 428 and EP 0 877 274, for instance in an initialisation stage of an observer video tracking system associated with a tracked autostereoscopic display. The use of such techniques for automatic target image capture increases the ease of use of a video tracking system and an associated autostereoscopic display and consequently increases the commercial prospects for such systems.

By using a two-stage approach in the form of a face locator and a face analyser, the face locator enables the more computing intensive face analysis to be limited to a number of face candidates. Such an arrangement is capable of detecting a face in a sequence of video images in real time, for instance at a speed of between 5 and 30 Hz, depending on the complexity of the image content. When used in an observer tracking autostereoscopic display, the face detection may be terminated automatically after a face is detected consistently over a number of consecutive images. The whole process may take no more than a couple of seconds and the initialisation need only be performed once at the beginning of each use of the system.

The face locator increases the reliability of the face analysis because the analysis need only be performed on the or each candidate face region located in the or each image. Although a non-face candidate region may contain image data similar to that which might be indicative of facial features, the face locator limits the analysis based on such characteristics to the potential face candidates. Further, the analysis helps to remove false face candidates found by the locator and is capable of giving more precise position data of a face and facial features thereof, such as the mid point between the eyes of an observer so that a target image of the eye region may be obtained.

By separating the functions of location and analysis, each function or step may use simpler and more efficient methods which can be implemented commercially without excessively demanding computing power and cost. For instance, locating potential face candidates using skin colour can accommodate reasonable lighting changes. This technique is capable of accommodating a relatively wide range of lighting conditions and is able to cope with people of different age, sex and skin colour. It may even be capable of coping with the wearing of glasses of light colours.

These techniques may use any of a number of modules in terms of computer implementation. Each of these modules may be replaced or modified to suit various requirements. This increases the flexibility of the system, which may therefore have a relatively wide range of applications, such as security surveillance, video and image compression, video conferencing, computer games, driver monitoring, graphical user interfaces, face recognition and personal identification.

The invention will be further described, by way of example, with reference to the accompanying drawings, in which;

BRIEF DESCRIPTION OF THE DRAWINGS

FIG. 4 illustrates a typical target image or template which is captured by the method illustrated in FIG. 3;

FIG. 12 is a diagram illustrating the effect of different positions of a face on the method illustrated on FIG. 7;

FIG. 13 is a diagram illustrating a modification to the method illustrated in FIG. 7 for accommodating different face positions;

Like reference numerals refer to like parts throughout the drawings.

DETAILED DESCRIPTION OF THE INVENTION

Figure 6:
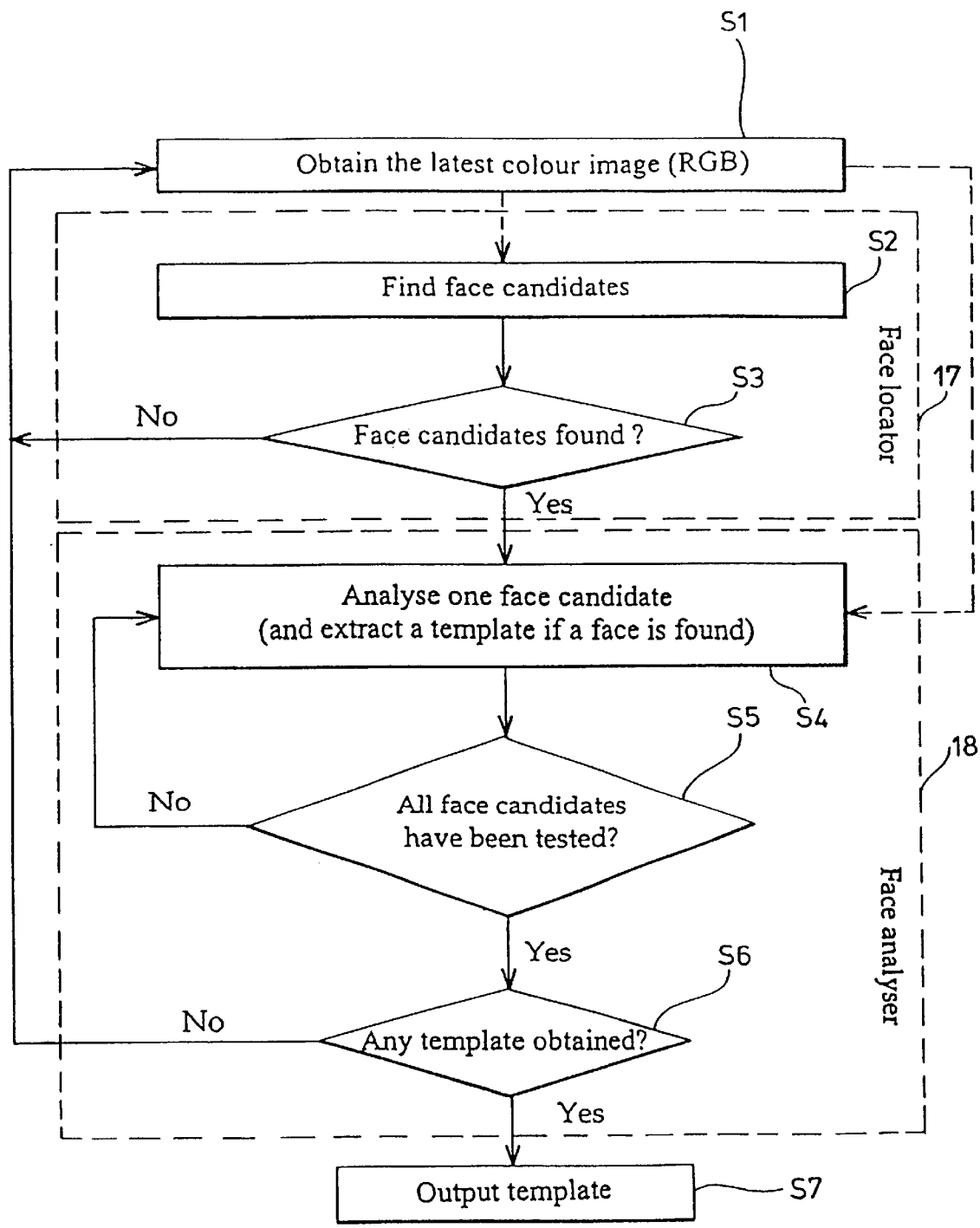
FIG. 6 is a flow diagram illustrating a method of detecting a human face constituting an embodiment of the invention.

FIG. 6 illustrates in flow diagram form a method of automatically detecting and locating a human face in a pixelated colour image from a video image sequence. The video image sequence may be supplied in real time, for instance by a video camera of the type described hereinbefore with reference to FIG. 2. The method is capable of operating in real time as the initialisation stage 9 shown in FIG. 3 and supplies a target image or template to the tracking stage 10 shown in FIG. 3.

In a step S1, the latest digital image in the red, green and blue (RGB) format is obtained. For instance, this step may comprise storing the latest field of video data from the video camera in a field store. In a step S2, the image is searched in order to locate regions constituting face candidates. A step S3 determines whether any face candidates have been found. If not, the step S1 is performed and the steps S2 and S3 are repeated until at least one face candidate is found in the latest image. The steps S2 and S3 therefore constitute a face locator 17 which will be described in more detail hereinafter.

The or each face candidate is then supplied to a face analyser 18 which analyses the face candidates to determine the presence of one or more characteristics indicative of facial features. A step S4 receives the portions of the image, one-by-one, corresponding to the face candidates located by the face locator 17. The step S4 analyses each face candidate and, if it determines that the candidate contains characteristics indicative of a facial feature, extracts a target image or template in the form of the eye region illustrated at 11 in FIG. 4 from the latest image supplied from the step S1. A step S5 determines whether all of the face candidates have been tested and the step S4 is repeated until all the candidates have been tested. A step S6 determines whether any templates have been obtained. If not, control passes to the step S1 and the procedure is repeated for the next colour image. If any template has been obtained, the or each such template is output at a step S7.

The face locator 17 may be of any suitable type and a manual technique for face location is described hereinafter. However, a suitable automatic technique is disclosed in GB 2 333 590 and EP 0 932 114 and this is described in detail with reference to FIGS. 7 to 13.

In a step S21, the video image is converted from the RGB format to the HSV (hue-saturation-value) format so as to obtain the saturation of each pixel. In practice, it is sufficient to obtain the S component only in the step S21.

Figure 8:
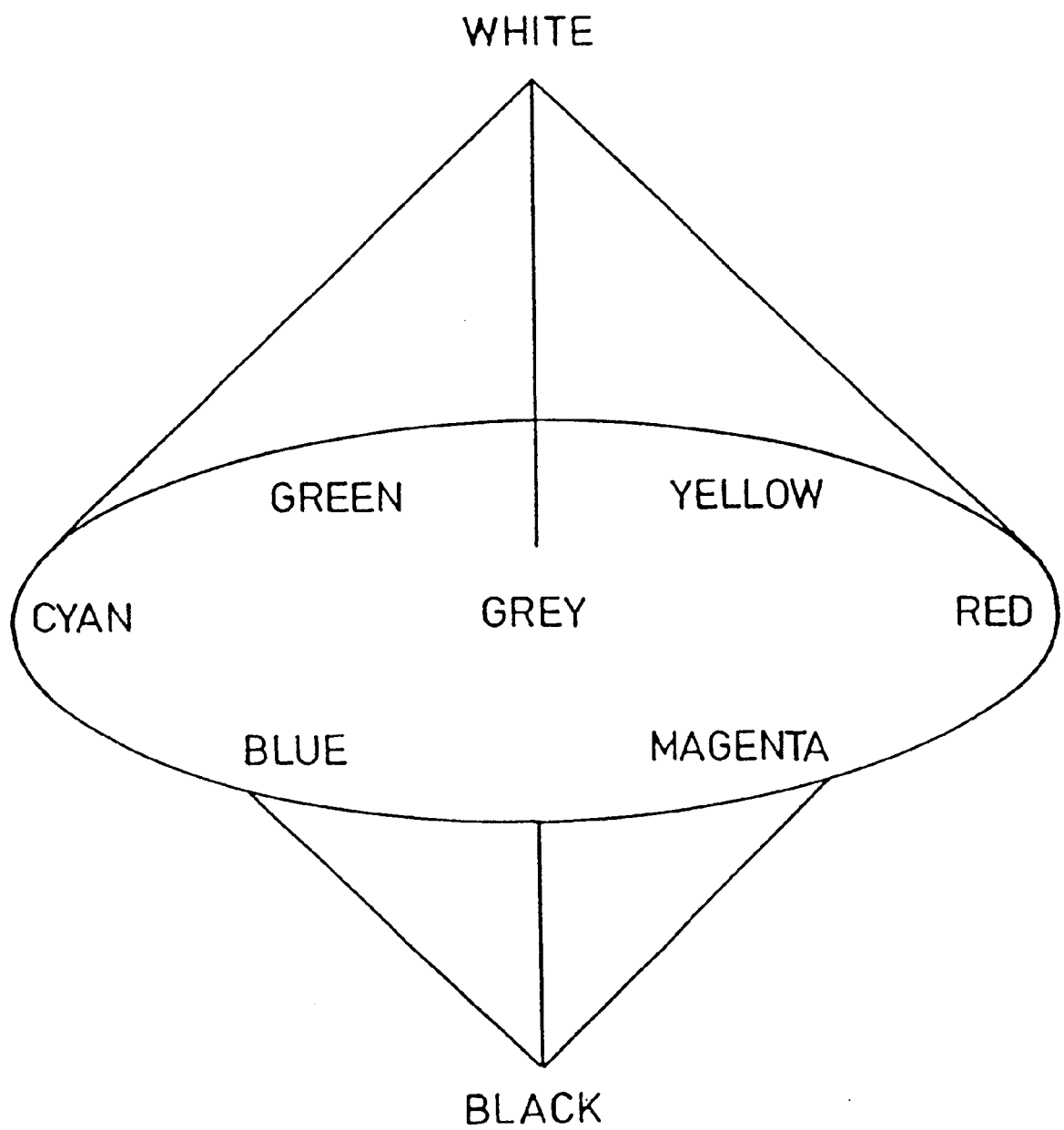
FIG. 8 is a diagram illustrating a hue-saturation-value (HSV) colour scheme.

The RGB format is a hardware-oriented colour scheme resulting from the way in which camera sensors and display phosphors work. The HSV format is closely related to the concepts of tint, shade and tone. In the HSV format, hue represents colour (for instance, the distinction between red and yellow), saturation represents the amount of colour that is present (for instance, the distinction between red and pink), and value represents the amount of light (for instance, the distinction between dark red and light red or between dark grey and light grey). The "space" in which these values may be plotted can be shown as a circular or hexagonal cone or double cone, for instance as illustrated in FIG. 8, in which the axis of the cone is the grey scale progression from black to white, distance from the axis represents saturation and the direction or angle about the axis represents the hue.

The colour of human skin is created by a combination of blood (red) and melanin (yellow, brown). Skin colours lie between these two extreme hues and are somewhat saturated but are not extremely saturated. The saturation component of the human face is relatively uniform.

Several techniques exist for converting video image data from the RGB format to the HSV format. Any technique which extracts the saturation component may be used. For instance, the conversion may be performed in accordance with the following expression for the saturation component S:

$$S = 0 \quad \text{for } \max(R, G, B) = 0$$
$$S = (\max(R, G, B) - \min(R, G, B))/\max(R, G, B) \quad \text{otherwise}$$

Figure 7:
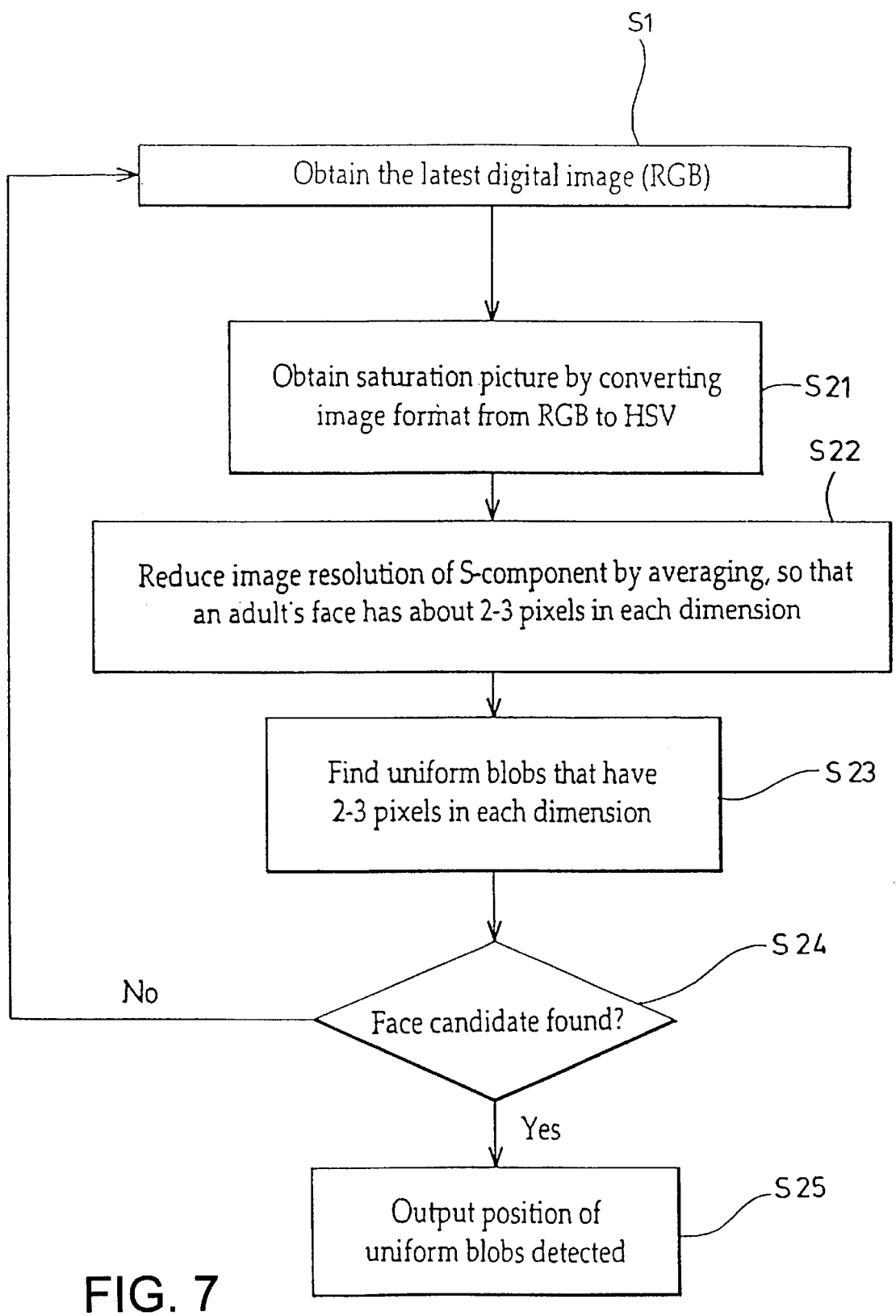
FIG. 7 is a flow diagram illustrating a face location part of the method illustrated in FIG. 6.

Following the conversion step S21, the spatial image resolution of the saturation component is reduced by averaging in a step S22. As described hereinbefore with reference to FIG. 2, the approximate distance of the face of an observer from the display is known so that the approximate size of a face in each video image is known. The resolution is reduced such that the face of an adult observer occupies about two to three pixels in each dimension as indicated in FIG. 7. A technique for achieving this will be described in more detail hereinafter.

A step S23 detects, in the reduced resolution image from the step S22, regions or "blobs" of uniform saturation of predetermined size and shape surrounded by a region of reduced resolution pixels having a different saturation. A technique for achieving this is also described in more detail hereinafter. A step S24 detects whether a face candidate or face-like region has been found. If not, the steps S1 to S24 are repeated. When the step S24 confirms that at least one candidate has been found, the position of the or each uniform blob detected in the step S23 is output at a step S25.

Figure 9A:
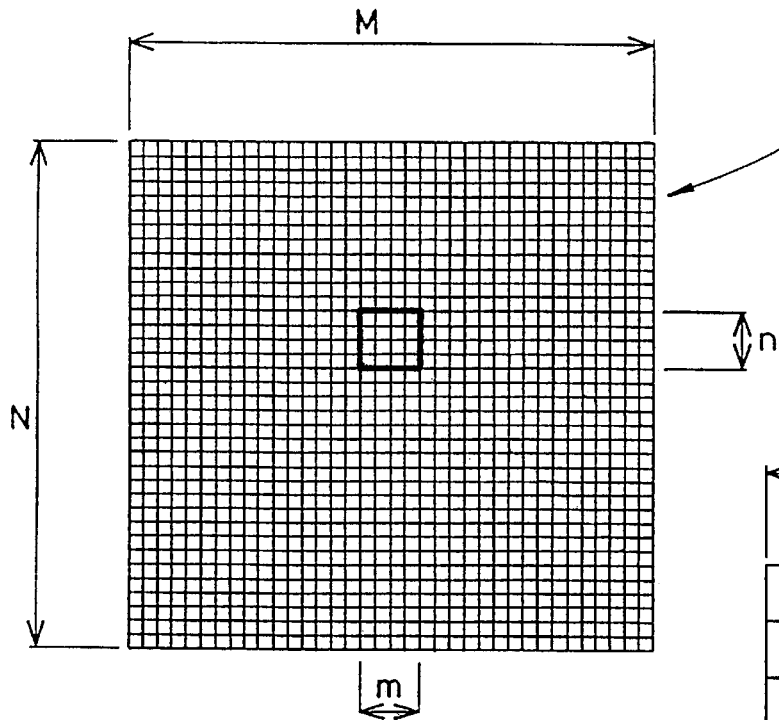
FIG. 9 is a diagram illustrating image resolution reduction by averaging in the method illustrated in FIG. 7.
Figure 9B:
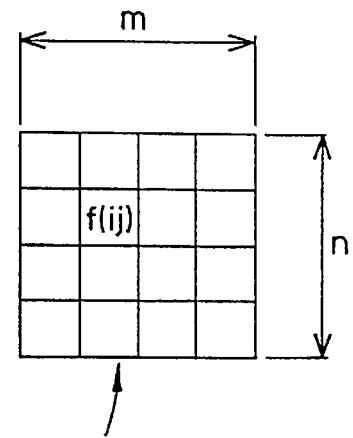
Figure 9C:
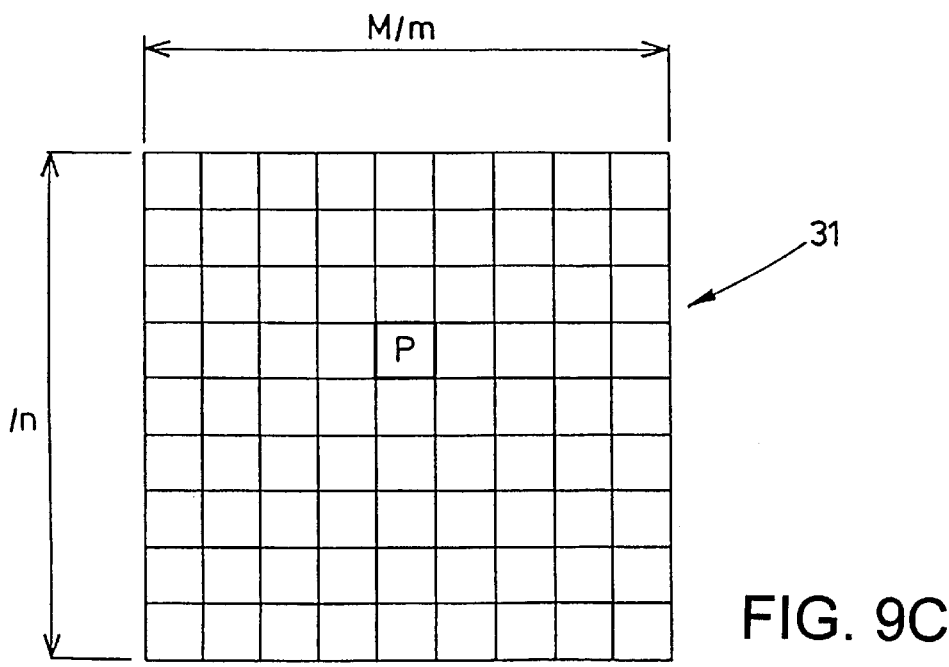

FIG. 9 illustrates the image resolution reduction step S22 in more detail. 30 illustrates the pixel structure of an image supplied to the step S1. The spatial resolution is illustrated as a regular rectangular array of M×N square or rectangular pixels. The spatial resolution is reduced by averaging to give an array of (M/m)×(N/N) pixels as illustrated at 31. The array of pixels 30 is effectively divided up into "windows" or rectangular blocks of pixels 32, each comprising m×n pixels of the structure 30. The S values of the pixels are indicated in FIG. 9 as f(i,j), for $0 \leq i < m$ and $0 \leq j < n$. The average saturation value P of the window is calculated as:

$$P = (1/mn)\sum_{i=o}^{m-1}\sum_{j=o}^{n-1} f(i, j)$$

In the embodiment illustrated in the drawings, the reduction in spatial resolution is such that an adult observer face occupies about two to three of the reduced resolution pixels in each dimension.

Figure 10A:
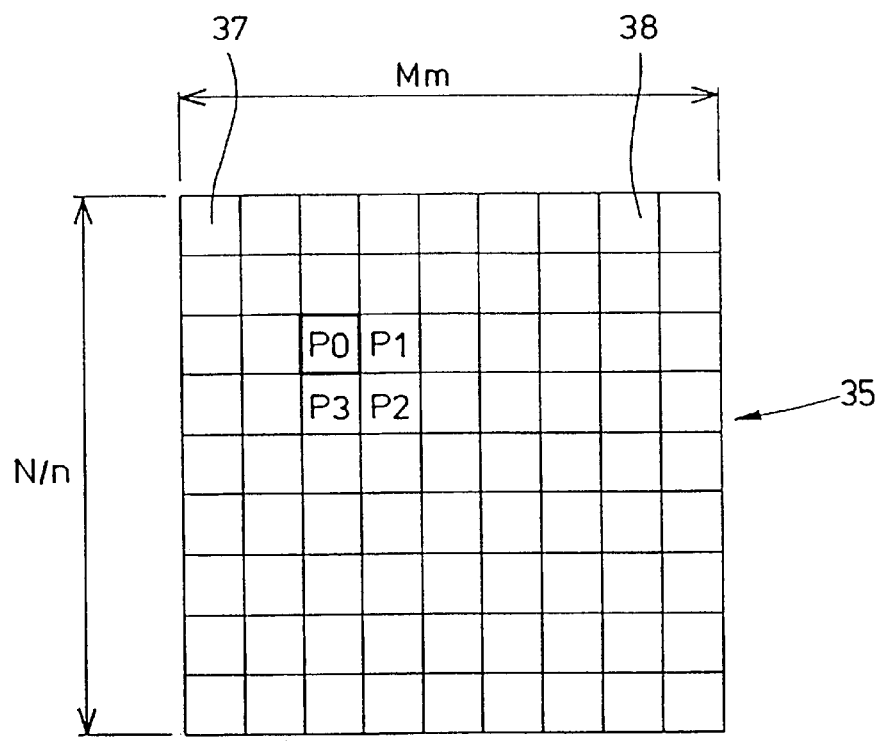
FIG. 10 is a diagram illustrating calculation of uniformity values in the method illustrated in FIG. 7.
Figure 10B:
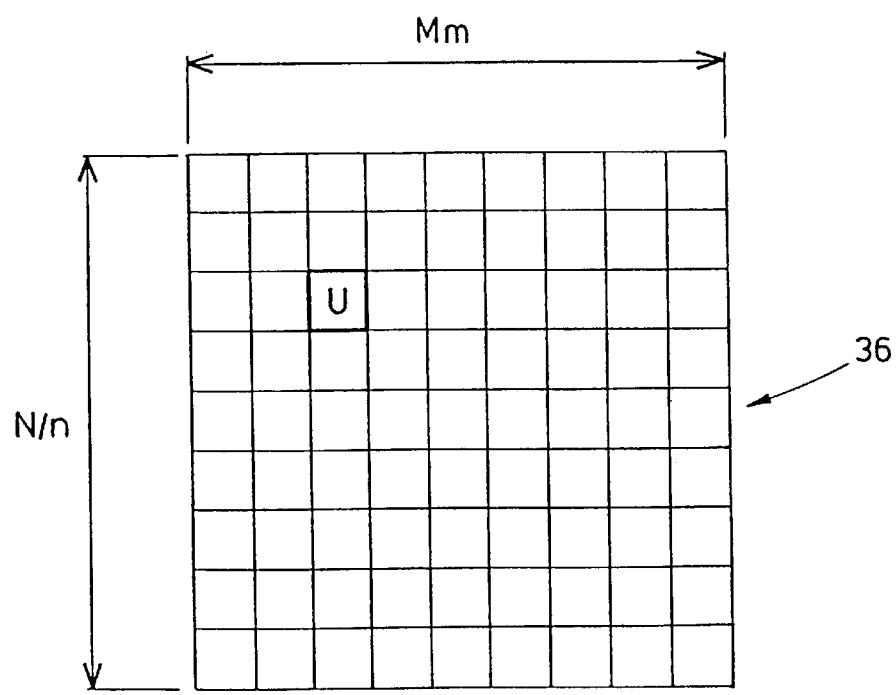
Figure 11A:
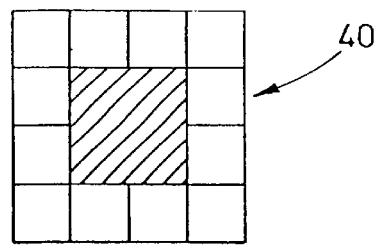
FIG. 11 is a diagram illustrating patterns used in a face-candidate selection in the method illustrated in FIG. 7.
Figure 11B:
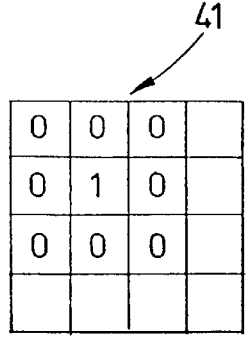
Figure 11C:
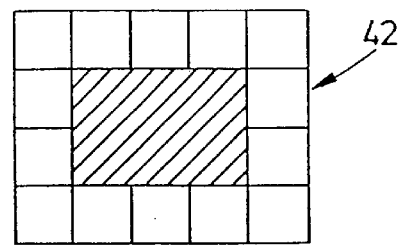
Figure 11D:
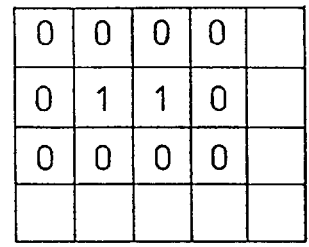
Figure 11E:
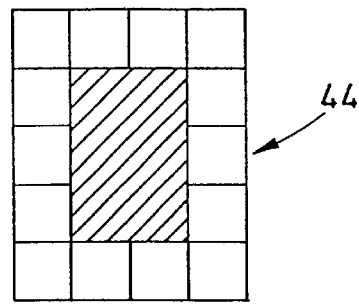
Figure 11F:
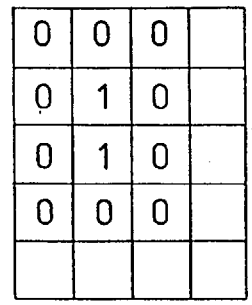
Figure 11G:
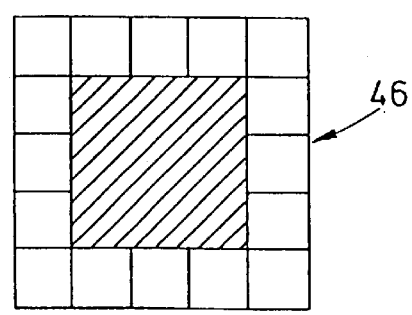
Figure 11H:
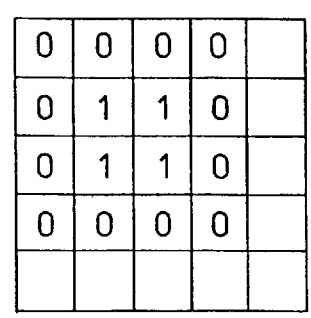

The step S23 comprises assigning a uniformity status or value U to each reduced resolution pixel and then detecting patterns of uniformity values representing face-like regions. The uniformity value is 1 or 0 depending on the saturations of the pixel and its neighbours. FIG. 10 illustrates at 35 a pixel having an averaged saturation value $P_0$ and the averaged saturation values $P_1$, $P_2$ and $P_3$ of the three neighbouring pixels. The assignment of uniformity values begins at the top left pixel 37 and proceeds from left to right until the penultimate pixel 38 of the top row has been assigned its uniformity value. This process is then repeated for each row in turn from top to bottom ending at the penultimate row. By "scanning" the pixels in this way and using neighbouring pixels to the right and below the pixel whose uniformity value has been calculated, it is possible to replace the average saturation values P with the uniformity values U by overwriting so that memory capacity can be used efficiently and it is not necessary to provide further memory capacity for the uniformity values.

The uniformity value U is calculated as:

$$U = 1 \quad \text{if } (f\max - f\min)/f\max \leq T$$
$$U = 0 \quad \text{otherwise}$$

where T is a predetermined threshold, for instance having a typical value of 0.15, fmax is the maximum of $P_0$, $P_1$, $P_2$ and $P_3$ and fmin is the minimum of $P_0$, $P_1$, $P_2$ and $P_3$.

When the ascribing of the uniformity values has been completed, the array 36 contains a pattern of 0s and 1s representing the uniformity of saturation of the reduced resolution pixels. The step S23 then looks for specific patterns of 0s and 1s in order to detect face-like regions. FIG. 11 illustrates an example of four patterns of uniformity values and the corresponding pixel saturation patterns which are like the face candidates in the video images. FIG. 11 shows at 40 a uniform blob in which dark regions represent averaged saturation values of sufficient uniformity to indicate a face-like region. The surrounding light regions or squares represent a region surrounding the uniform saturation pixels and having substantially different saturations. The corresponding pattern of uniformity values is illustrated at 41 and compresses a pixel location with the uniformity value 1 completely surrounded by pixel locations with the uniformity value 0.

Similarly, FIG. 11 shows at 42 another face-like region and at 43 the corresponding pattern of uniformity values. In this case, two horizontally adjacent pixel locations have the uniformity value 1 and are completely surrounded by pixel locations having the uniformity value 0. FIG. 11 illustrates at 44 a third pattern whose uniformity values are as shown at 45 and are such that two vertically adjacent pixel locations have the uniformity value 1 and are surrounded by pixel locations with the uniformity value 0.

The fourth pattern shown at 46 in FIG. 11 has a square block of four (two-by-two) pixel locations having the uniformity value 1 completely surrounded by pixel locations having the uniformity value 0. Thus, whenever any of the uniformity value patterns illustrated at 41, 43, 45 and 47 in FIG. 11 occurs, the step S23 indicates that a face-like region or candidate has been found. Searching for these patterns can be performed efficiently. For instance, the uniformity values of the pixel locations are checked in turn, for instance left to right in each row and top to bottom of the field. Whenever a uniformity of value of 1 is detected, the neighbouring pixel locations to the right and below the current pixel location are inspected. If at least one of these uniformity values is also 1 and the region is surrounded by uniformity values of 0, then a pattern corresponding to a potential face candidate is found. The corresponding pixel locations may then be marked, for instance by rep,lacing their uniformity values with a value other than 1 or 0, for example a value of 2. Unless no potential face candidate has been found, the positions of the candidates are output.

The appearance of the patterns 40, 42, 44 and 46 may be affected by the actual position of the face-like region in relation to the structure of the reduced resolution pixels 36. FIG. 12 illustrates an example of this for a face-like region having a size of two-by-two reduced resolution pixels as shown at 49. If the face-like region indicated by a circle 50 is approximately centred at a two-by-two block, the pattern 47 of uniformity values will be obtained and detection will be correct. However, if the face were shifted by the extent of half a pixel in both the horizontal and vertical direction as illustrated at 51, the centre part of the face-like region may have a uniformity value which is different from the surrounding region. This may result in failure to detect a genuine candidate.

In order to avoid this possible problem, the steps S21 to S24 may be repeated for the same video field or for one or more succeeding video fields of image data. However, each time the steps S21 to S24 are repeated, the position of the array 31 of reduced resolution pixels is changed with respect to the array 30 of the colour image pixels. This is illustrated in FIG. 13 where the whole image is illustrated at 52 and the region used for spatial resolution reduction by image averaging is indicated at 53. The averaging is performed in the same way as illustrated in FIG. 9 but the starting position is changed. In particular, whereas the starting position for the first pixel in FIG. 8 is at the top left corner 54 of the whole image 52, FIG. 13 illustrates a subsequent averaging where the starting position is shifted from the top left corner by an amount Sx to the right in the horizontal direction and Sy downwardly in the vertical direction, where:

$$0<Sx<m \text{ and } 0<Sy<n$$

Each image may be repeatedly processed such that all combinations of the values of Sx and Sy are used so that mxn processes must be performed. However, in practice, it is not necessary to use all of the starting positions, particularly in applications where the detection of face-like regions does not have to be very accurate. In the present example where the face-like region detection forms the first step of a two step process, the values of Sx and Sy may be selected from a more sparse set of combinations such as:

$$Sx=i\times(m/p) \text{ and } Sy=j\times(n/q)$$

Where i,j,p and q are integers satisfying the following relationships:

$0 \leq i < p$
$0 \leq j < q$
$1 \leq p < m$
$1 \leq q < n$

This results in a total of pxq combinations.

As mentioned hereinbefore, the steps S21 to S24 may be repeated with the different starting positions on the same image or on a sequence of images. For real time image processing, it may be necessary or preferable to repeat the steps for the images of a sequence. The method may be performed very quickly and can operate in real time at between 10 and 60 Hz rate depending on the number of face candidates present in the image. Thus, within a short period of the order of a very few seconds or less, all possible positions can be tested.

Figure 1:
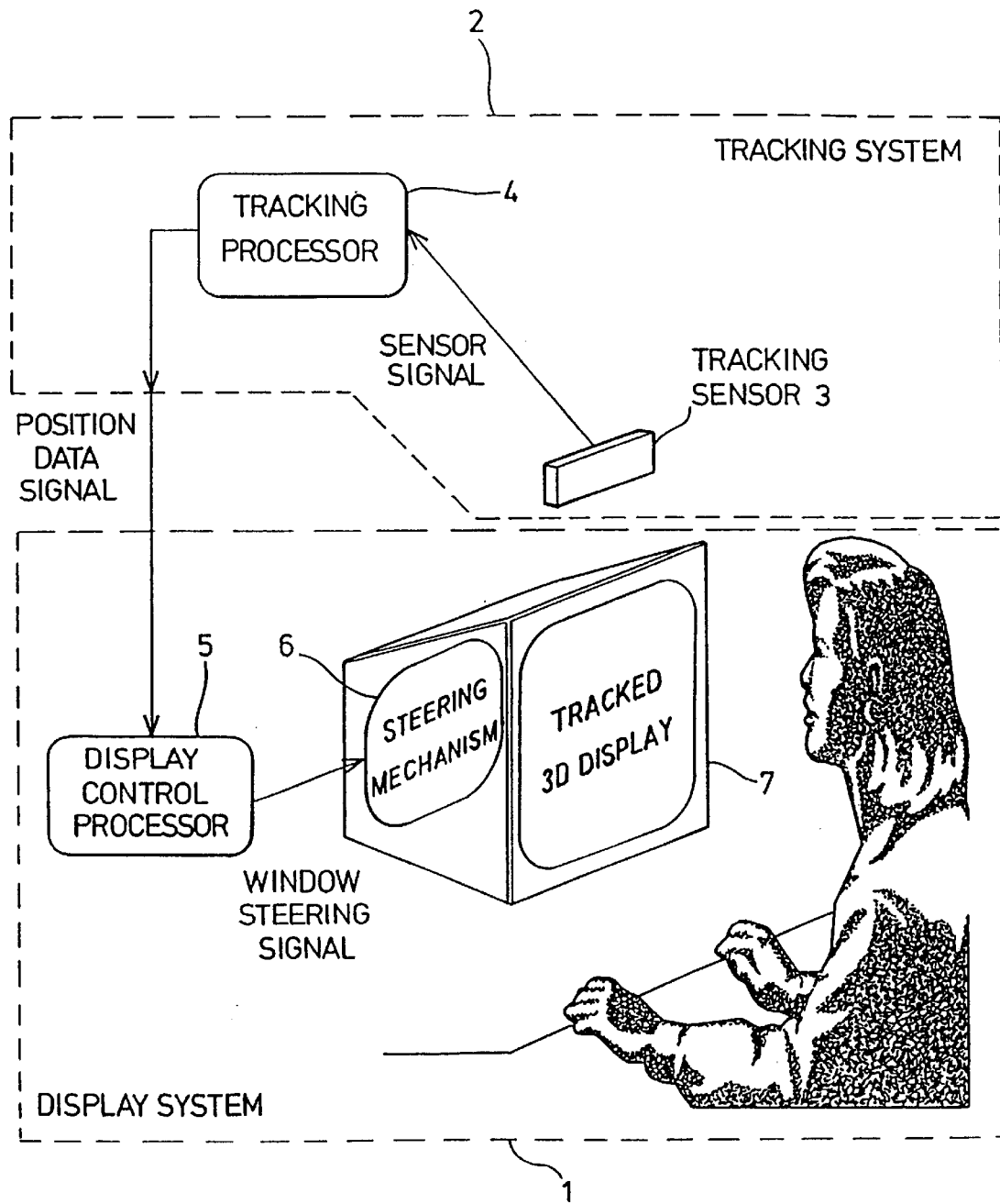
FIG. 1 is a block schematic diagram of a known type of observer tracking autostereoscopic display.
Figure 2:
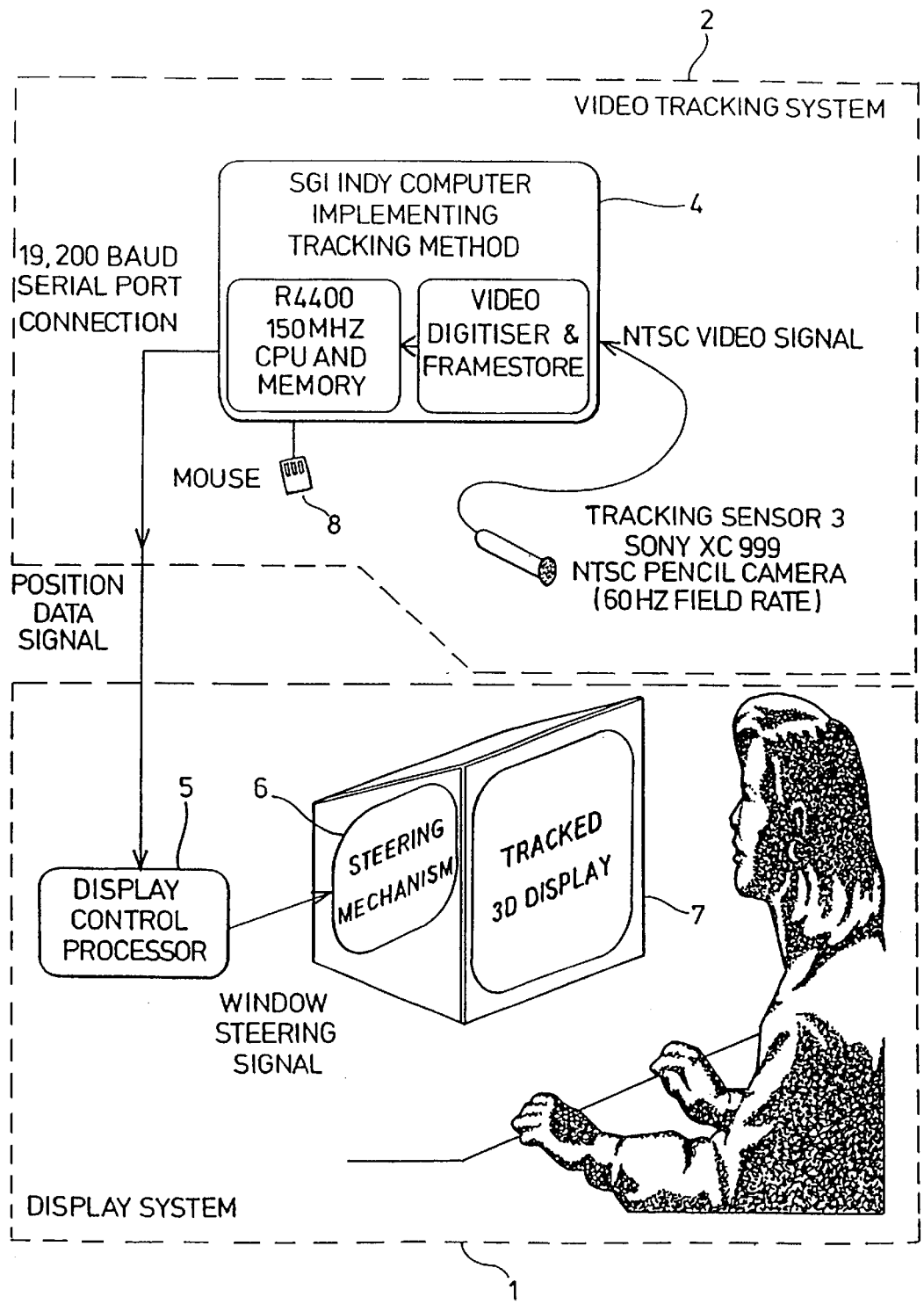
FIG. 2 is a block schematic diagram of an observer tracking display to which the present invention may be applied.
Figure 3:
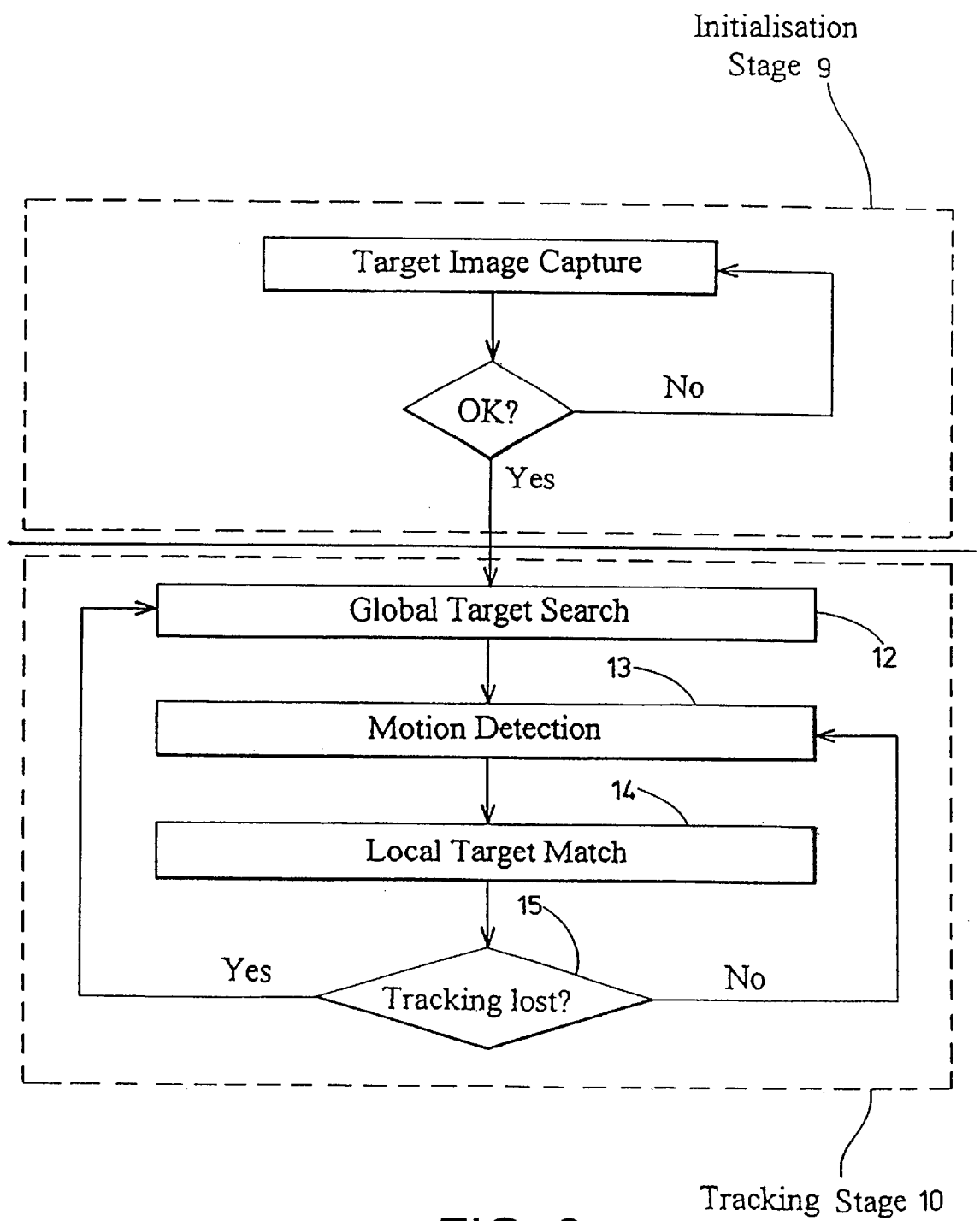
FIG. 3 is a flow diagram illustrating observer tracking in the display of FIG. 2.
Figure 5:
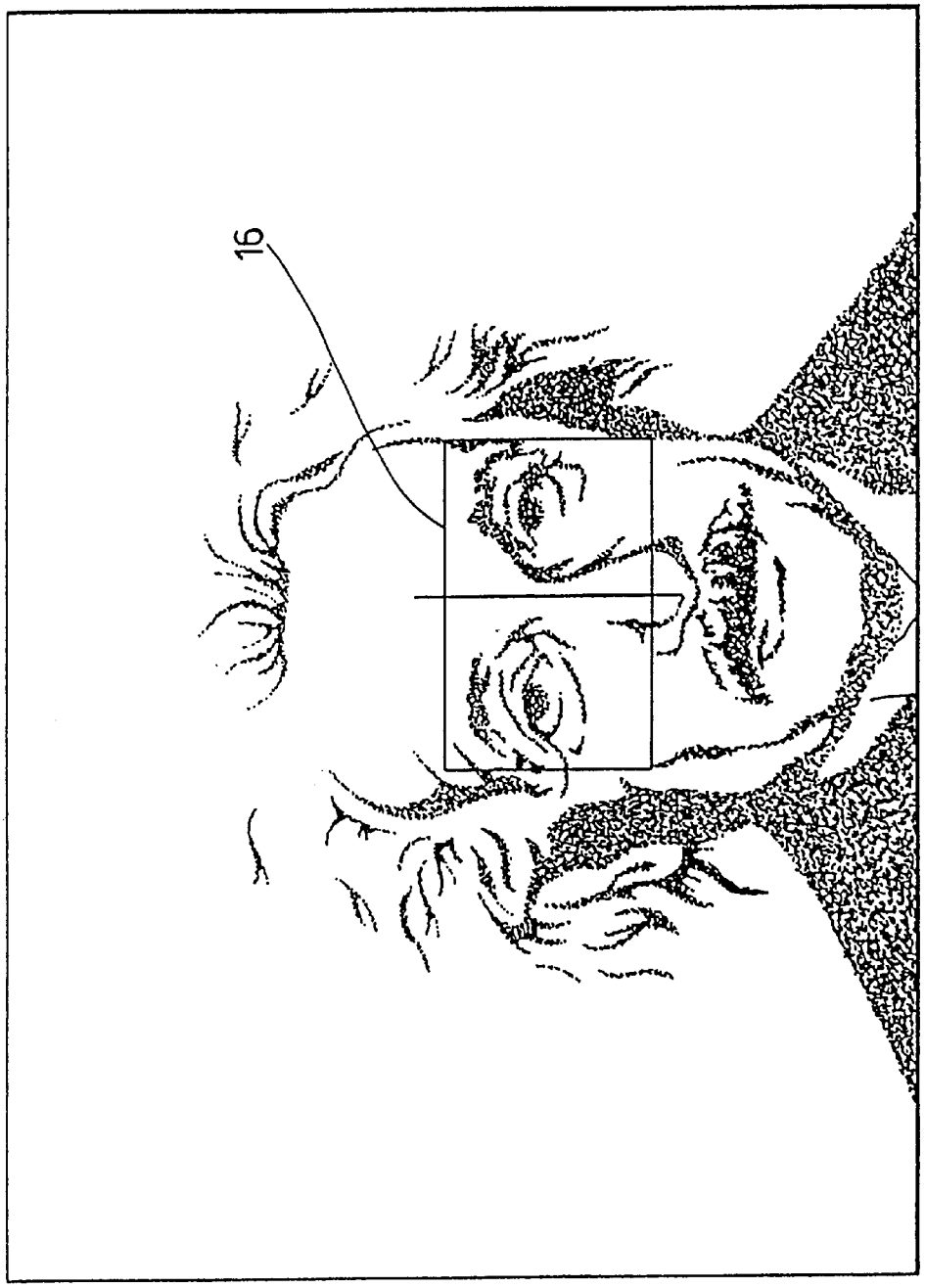
FIG. 5 illustrates the appearance of a display during template capture by the display of FIG. 2.

The method illustrated in FIG. 7 may be performed on any suitable hardware, such as that illustrated in FIG. 2. The tracking processor 4 as described hereinbefore is capable of being programmed to implement the method of FIG. 7 as part of the initialisation stage 9 shown in FIG. 3. The data processing is performed by the R4400 processor and associated memory and the processor 4 includes a video digitiser and frame store as illustrated in FIG. 2 for storing the saturation values, the averaged saturation values of the reduced resolution pixels and the uniformity values.

Figure 14:
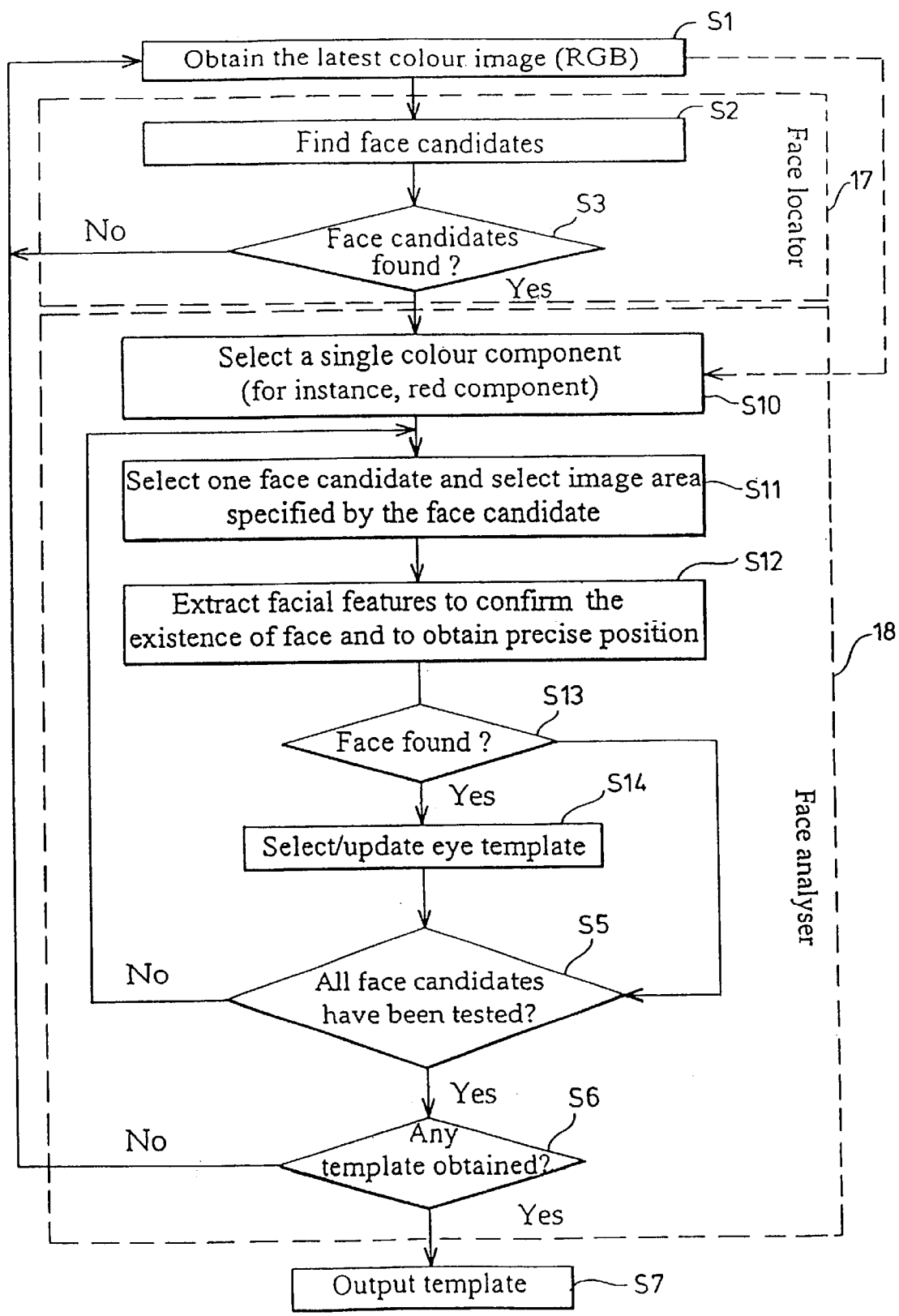
FIG. 14 is a flow diagram illustrating in more detail the face analysis stage of the method illustrated in FIG. 6.

FIG. 14 illustrates the face analyser 18 in more detail. In particular, the analysis formed in the step S4 is shown as steps S10 to S14 in FIG. 14.

Although the analysis may be performed in the RGB domain, it is sufficient to make use of a single colour component. Accordingly, the step S10 selects, for example, the red colour component from the latest colour image. As an alternative, another single-value component may be used. For example, a contrast image may be derived using the equation:

$$C=\max(R,G,B)-\min(R,G,B)$$

The use of such a contrast image may improve detection of the omega-shape as described hereinafter.

The step S11 selects one of the face candidates provided by the face locator 17 and selects the image area of the red component specified by the face candidate. The step S12 extracts facial features to confirm the existence of a face in the image and to obtain the precise position of the face. The step S13 determines whether a face is found and, if not, passes control to the step S5. If a face has been found, the step S14 selects or updates the target image in the form of an eye template, such as that shown at 11 in FIG. 4. Control then passes to the step S5. The steps S11 to S14 are repeated until all face candidates have been tested.

It is possible for this method to detect more than one face in an image. However, in certain applications such as current observer tracking autostereoscopic displays, only a single user is permitted. If more than one face is detected, a selection rule may be used to select a single template. For example, the selected template may be the first one to be detected or maybe the one that is positioned nearest the centre of the image. As an alternative, each template may be given a quality measure, for instance relating to the degree of symmetry, and the template with the best quality measure may be selected. Such a technique is described in more detail hereinafter.

Figure 15:
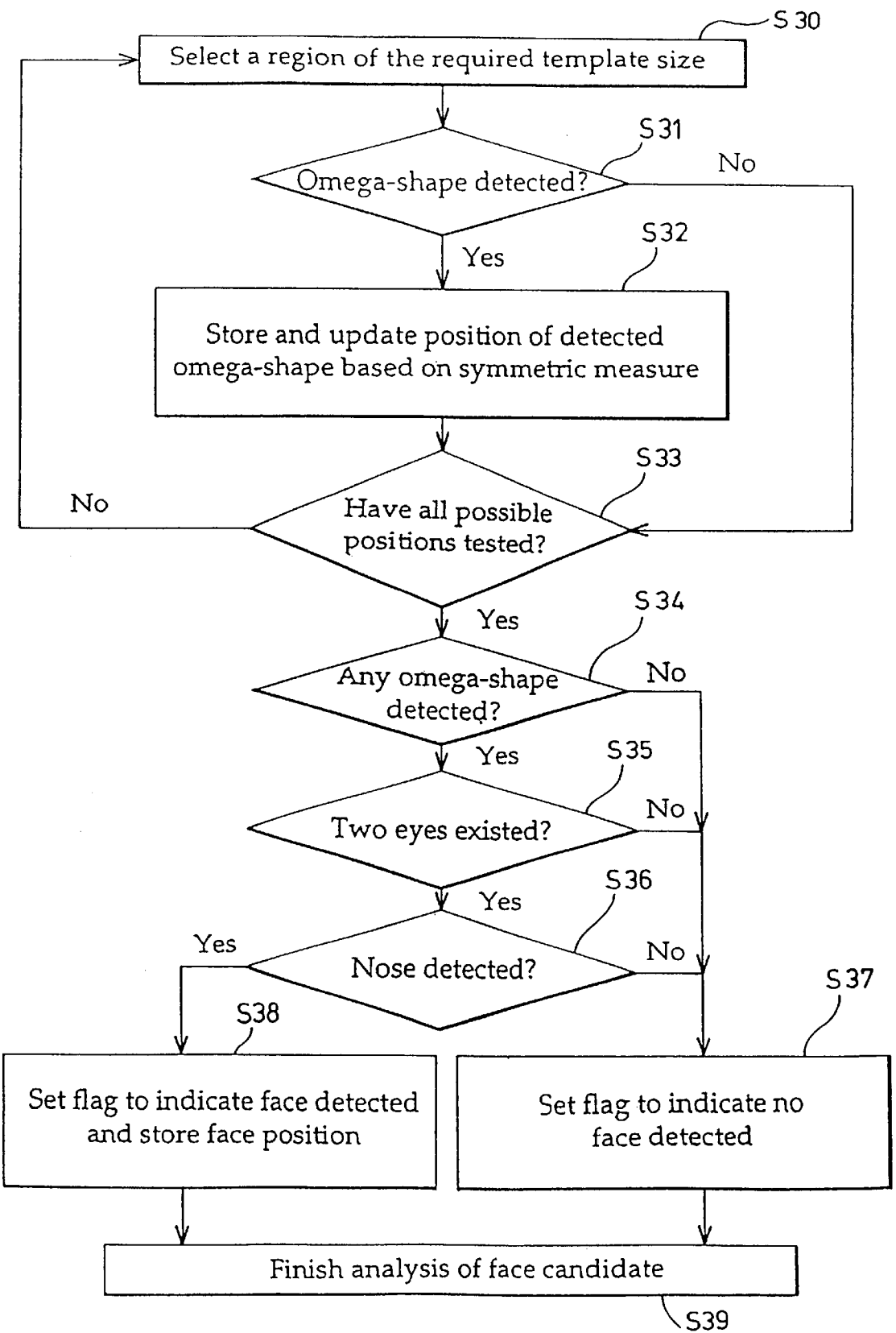
FIG. 15 is a flow diagram illustrating in more detail a facial feature extraction step of the method illustrated in FIG. 14.

The extraction of facial features forming the step S12 is shown in more detail in FIG. 15 and comprises steps S30 to S39. In the step S30, a region of the red component image of the required template size is selected. The step S31 detects whether an omega-shape has been detected and, if so, the position of the detected omega-shape based on symmetric measure is stored or updated in the step S32. The step S33 determines whether all possible positions have been tested and, if not, the step S30 selects another region from the image area specified by the face candidate.

Once all possible positions have been tested, the step S34 determines whether any omega-shape vertical integral projection has been detected. If so, the step S35 determines whether two eyes exist in the template-sized region. If so, the step S36 determines whether a nose has been detected. If so, a step S38 sets a flag to indicate that a face has been detected and stores the position of the face. If any of the tests in the steps S34 to S36 is negative, the step S37 sets a flag to indicate that no face has been detected. The step S39 finishes analysis of the face candidate.

Figure 16A:
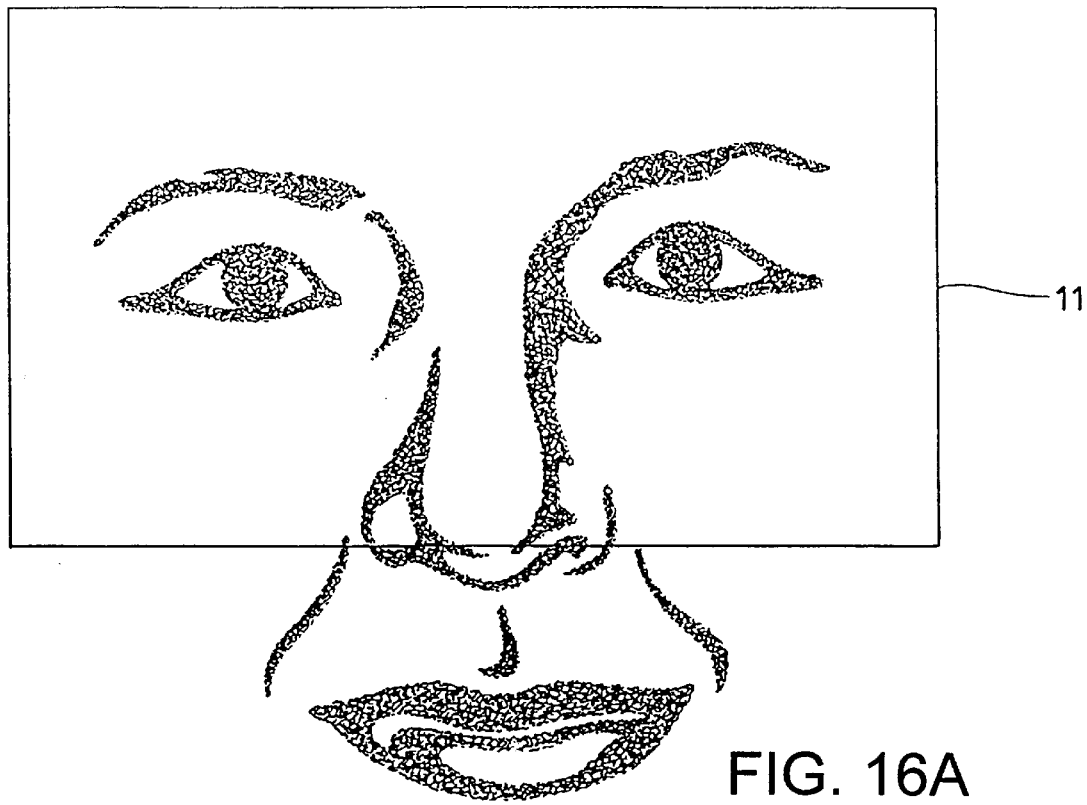
FIG. 16 illustrates an image portion of an eye region and a corresponding vertical integral projection.
Figure 16B:
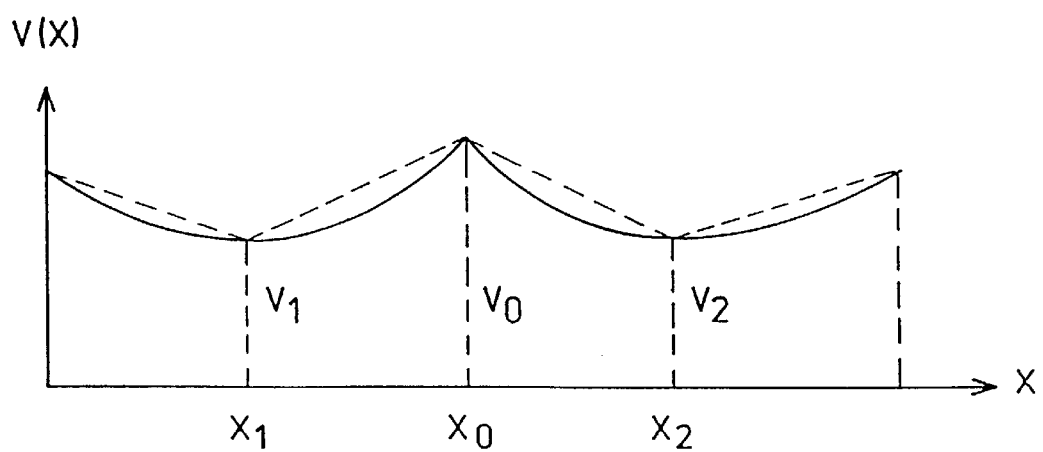
Figure 17B:
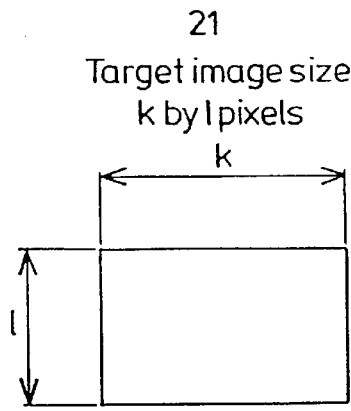
FIG. 17 illustrates a technique for searching for an eye signature.
Figure 17A:
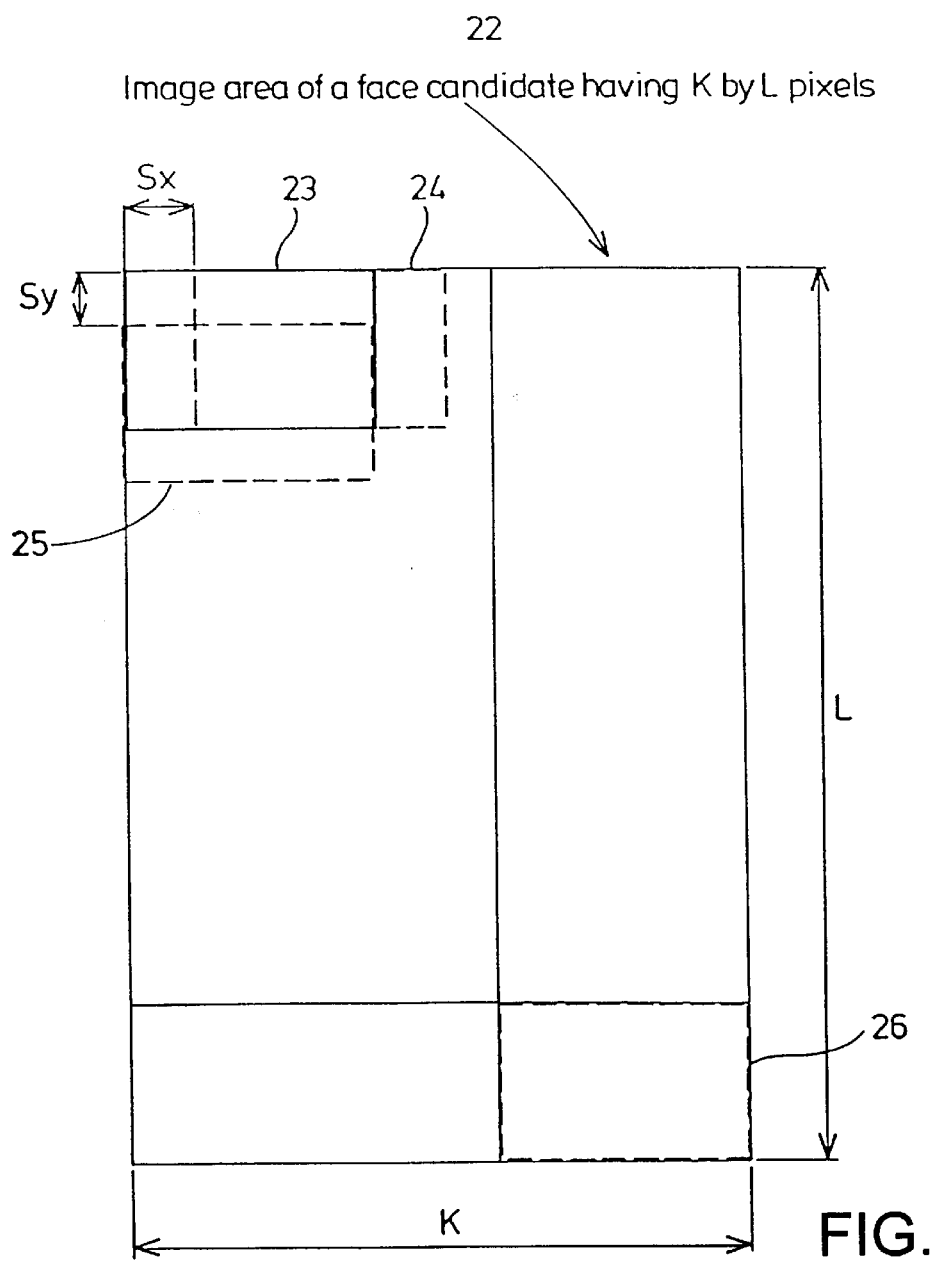

FIG. 16 illustrates the desired eye region template 11 and shows, below this, the corresponding vertical integral projection profile which resembles the "ω". The step S31 detects such profiles, which are characterised by a peak or maximum brightness Vo at a horizontal position $X_0$ with first and second minima of brightness V1 and V2 located symmetrically about the maximum at $X_1$ and $X_2$. The required template or target image size is illustrated at 21 in FIG. 17 and comprises k by l pixels. The image area of a face candidate comprises K by L pixels and is illustrated at 22. The step S30 selects an initial region 23 of the required template size for analysis and the steps S31 to S33 are performed. The step S30 then selects a horizontally adjacent region 24 which is displaced to the right relative to the region 23 by a distance Sx. This is repeated until the selected regions have covered the top strip of the image area 22. The process is further repeated with a vertical displacement Sy from a starting position indicated at 25. Thus, each horizontal strip is "covered" by horizontally overlapping regions and the whole of the area 22 is covered by vertically overlapping strips until the selected region is located at 26. The step S33 determines that all possible positions have been tested and the step S34 is then performed.

Figure 18:
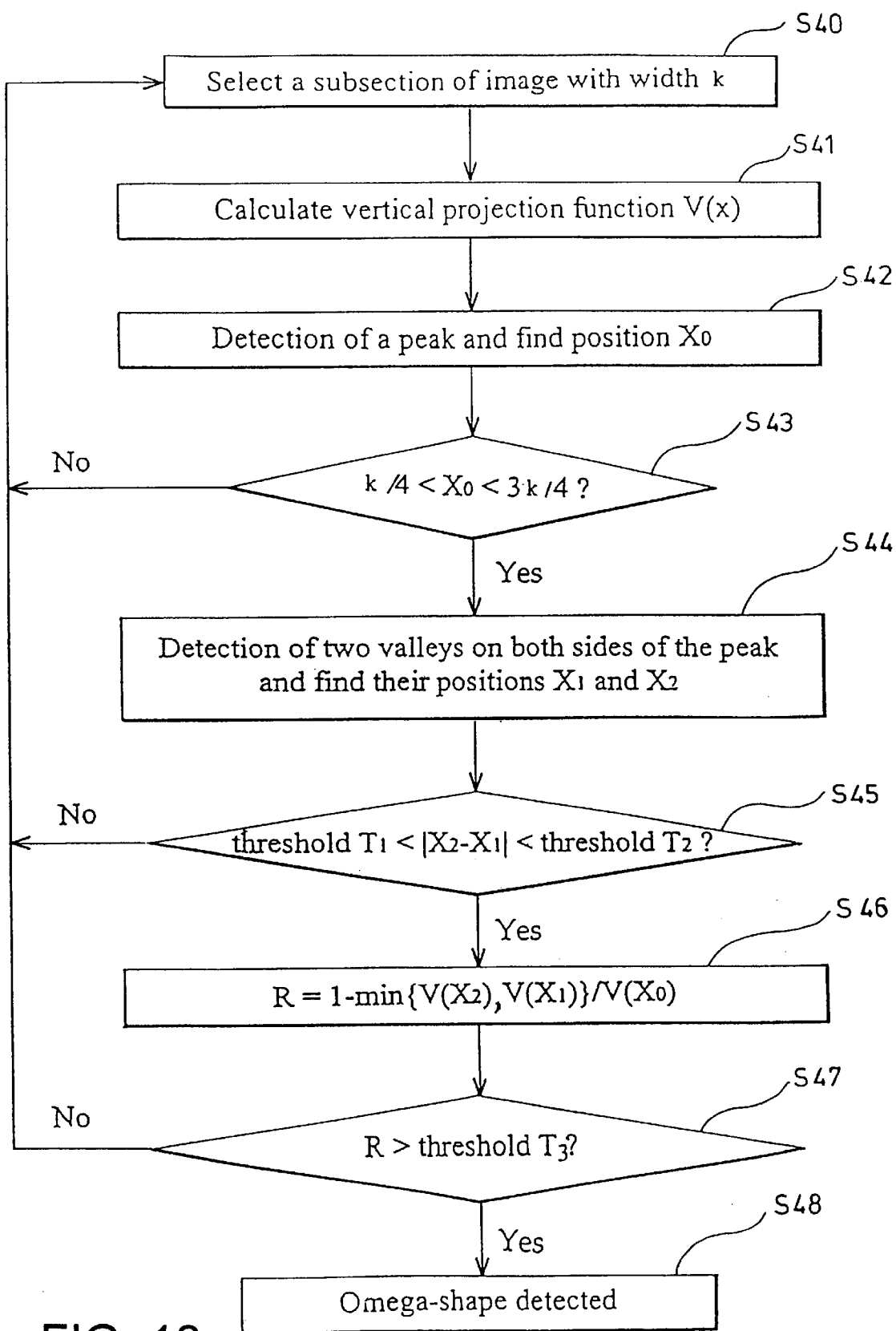
FIG. 18 is a flow diagram illustrating a further facial characteristic extraction technique forming part of the method illustrated in FIG. 14.

The function of the step S31 is illustrated in more detail by steps S40 to S48 in FIG. 18. The step S40 selects the subsection of the image of width k pixels. The parameter k is chosen so that, with the relative horizontal displacement Sx, each strip is covered by overlapping rectangles. Similarly, the parameters l and Sy are selected to give vertically overlapping strips. In general, these parameters are selected so that Sx is equal to k/4 and Sy is equal to l/4.

The step S41 calculates the vertical projection function V(x). This is calculated as:

$$V(x) = \sum_{y=y_1}^{y_2} I(x,y)$$

where I(x,y) is the intensity of the pixel at co-ordinates x, y and the area of the subsection image is given by (x1,x2)×(y1,y2). The step S42 then detects the peak or maximum of this function and finds the horizontal position $X_0$.

The step S43 determines whether the position $X_0$ of the maximum is within the central region of the subsection, which is defined as the region from k/4 to 3k/4. If not, control returns to the step S40. Otherwise, the step S44 detects the minima on both sides of the peak or maximum and finds their positions $X_1$ and $X_2$. The step S44 then detects whether the locations of the minima correspond to the eye separation of an adult. This eye separation is normally between 55 and 70 cm and the corresponding thresholds are $T_1$ and $T_2$. If the magnitude of the difference between $X_1$ and $X_2$ lies between these thresholds (step S45), the step S46 is performed. Otherwise, control returns to the step S40.

The step S46 forms the peak-to-valley ratio R in accordance with the expression:

$$R = 1 - \min(V(X_2), V(X_1))/V(X_0)$$

The step S47 compares the ratio R with a threshold $T_3$, for which a typical value is 0.2. If the ratio is below this threshold, control returns to the step S40. If the ratio exceeds the threshold, the step S48 indicates that an omega shape has been detected.

When an omega shape has been detected, a quality measure which is related to the degree of horizontal symmetry about a centre line of the subsection is calculated. For example, this may be calculated as:

$$Q = \sum_{x=o}^{X_0} |V(X_0 - x) - V(X_0 + x)|$$

The Quality measure may be used to select the "best" omega shape for the current face candidate and, in particular, to determine the best horizontal and vertical position of the eye region, although the vertical position may be determined as described hereinafter.

Figure 19A:
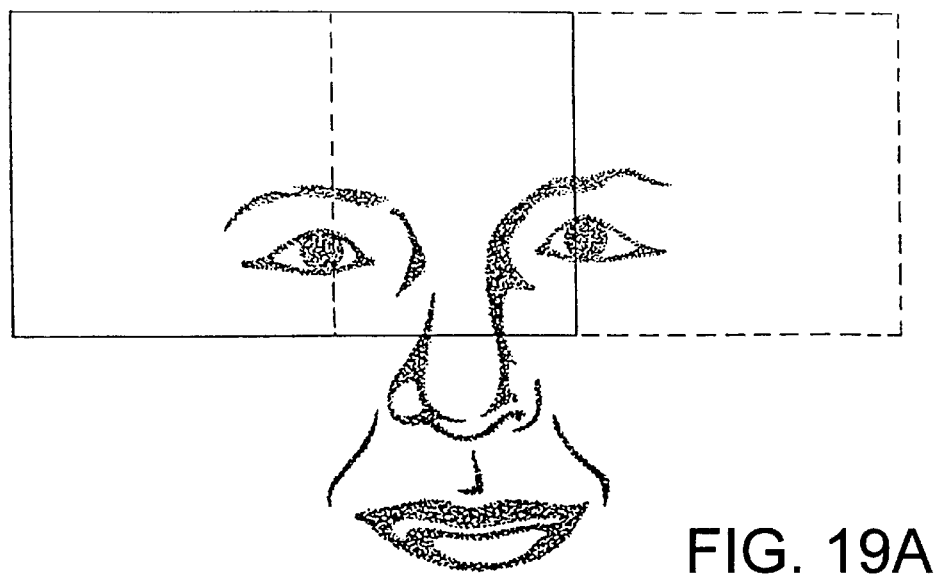
FIG. 19 illustrates vertical integral projections of too coarse a step size.
Figure 19B:
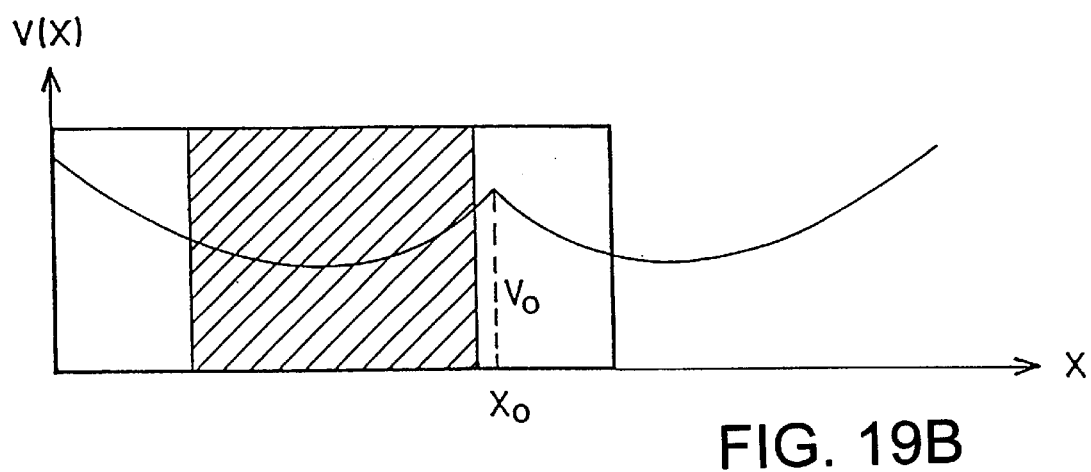
Figure 19C:
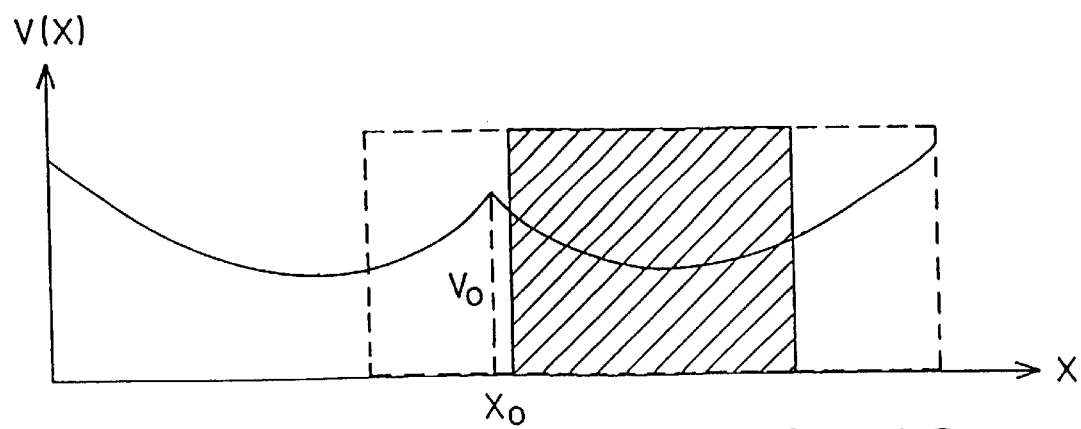

FIG. 19 illustrates the effect of inappropriate choice of the horizontal step size Sx. In particular, if Sx is set to a large value, for example greater than k/2, it is possible that a peak or maximum will not be detected in any subsection. As shown in the vertical integral projection profile in FIG. 19 and, in particular, in the shaded parts, there is no maximum or peak within the central region so that the step S42 would find a position $X_0$ which is outside the range in the step S43. The size of the step Sx should therefore be smaller than k/2 and a value of k/4 has been found to work well in maintaining computing efficiency while avoiding missing the central peak of the omega shaped profile.

The peak of the best omega shape, for instance having the highest quality measure Q, indicates the middle of the two eyes of the eye region and defines the centre position of the target image or template. However, the vertical position is not well defined because subsections displaced slightly upwards or downwards from the best position are likely to display similar omega shaped vertical integral projection profiles.

One technique for vertically centering the subsection on the eye region involves locating the best horizontal position and then displacing the subsection upwardly and downwardly until the omega shape can no longer be detected. A vertical position mid way between these upper and lower limit positions may then be selected as the vertical position for the target image.

An alternative technique for locating the correct vertical position is based on the peak-to-valley ratio. In this case, the best horizontal position is again determined and the subsections are displaced vertically while monitoring the peak-to-valley ratio. The position corresponding to the highest ratio is then selected as the vertical position of the middle of the target image.

Figure 20A:
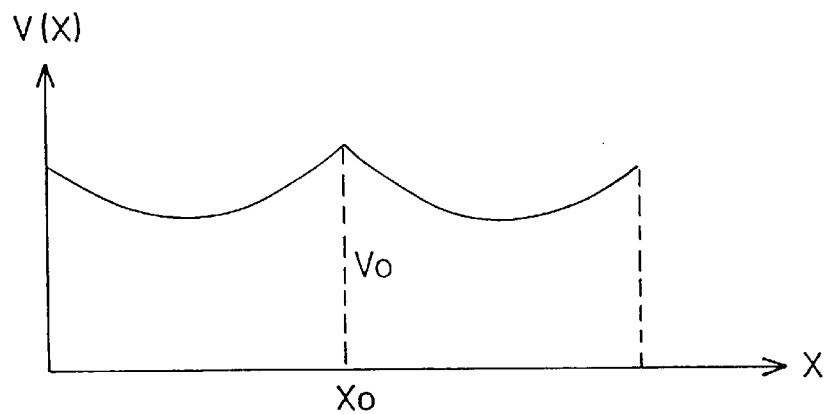
FIG. 20 illustrates the use of horizontal integral projection profiles for eliminating false face candidates.
Figure 20B:
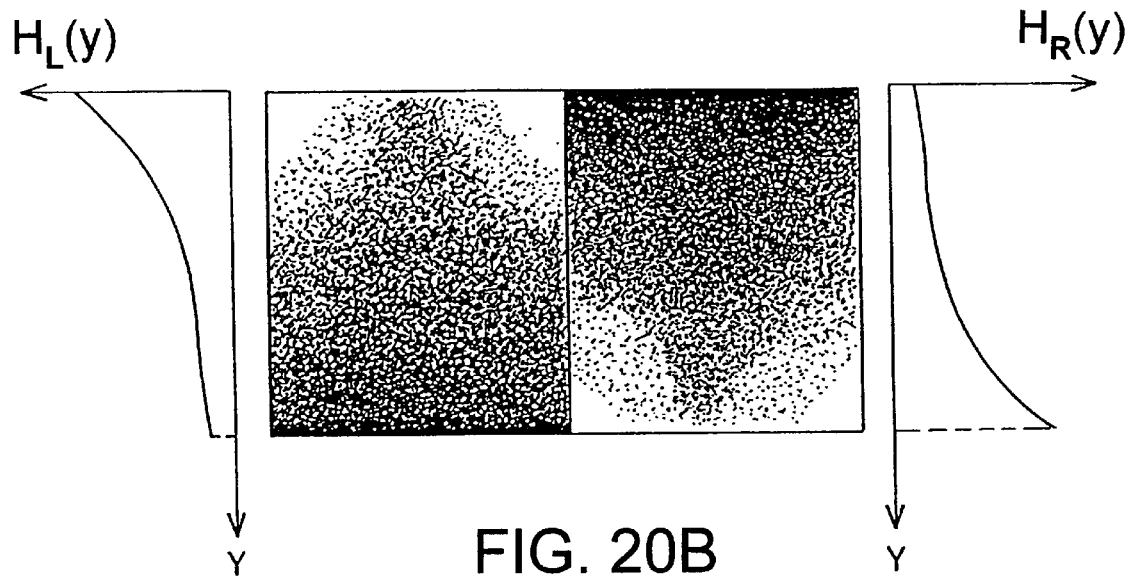
Figure 20C:
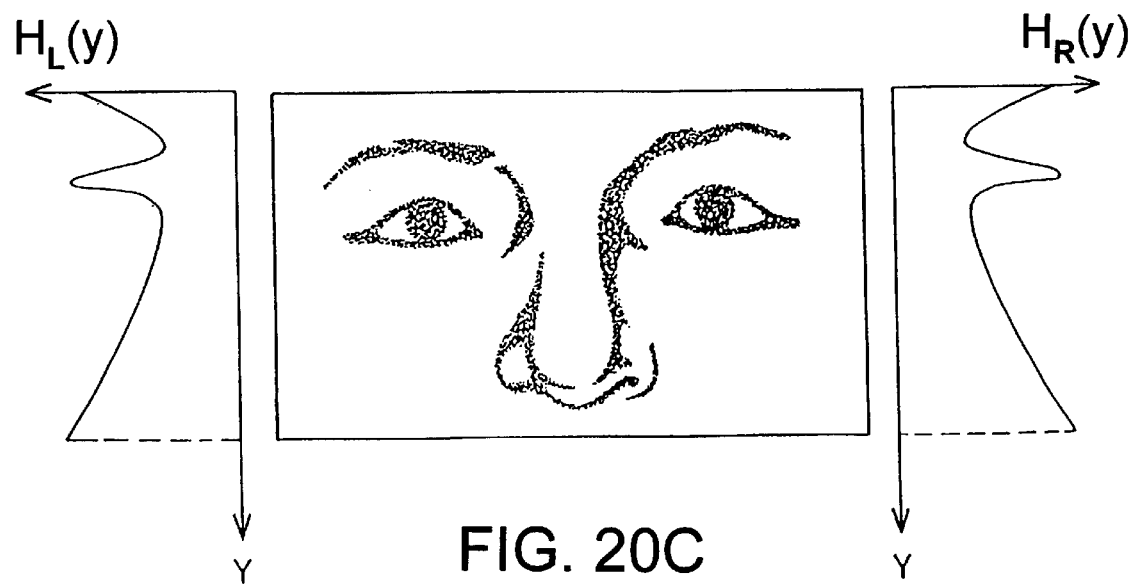

Although the existence of an omega shape in the vertical integral projection profile is a strong indication that an eye region exists, this is based largely on the assumption of symmetry of a human face. However, an image which is not symmetrical with respect to its centre line may also produce an omega-shaped profile. An example of such an image is illustrated at the middle of FIG. 20 directly above an eye region and the vertical profile for both images is substantially the same and is illustrated at the top of FIG. 20. In this case, the non-symmetrical image is obtained by reflecting the left half of the image about the centre line and then turning the resulting right half image upside down.

In order to avoid false face detections caused by such images, a technique based on horizontal integral projection profiles may be used. In particular, when an omega shape has been detected and an image area of the desired template size is selected such that its centre is aligned with the central peak or maximum of the omega shape, horizontal integral projections are applied to the left and the right halves of the image. The horizontal integral projection profile for the left half is given by:

$$H_L(y) = \sum_{x=0}^{X_0} I(X_0 - x, y)$$

And the horizontal integral projection profile for the right half is given by:

$$H_R(y) = \sum_{x=o}^{X_0} I(X_0 + x, y)$$

A symmetrical measure Sm is then defined as:

$$Sm = \sum_{y=y1}^{y2} |H_L(y) - H_R(y)| / \left[ \sum_{y=y1}^{y2} (H_L(y) + H_R(y)) \right]$$

The minimum and maximum values of Sm are 0 and 1. The value of Sm should not exceed a predetermine threshold, which is typically between 0.15 and 0.2. By accepting an omega shape only if it passes this test, the chances of false detection are reduced.

The horizontal integral projection profiles for the two images are illustrated in FIG. 20. The false image gives horizontally asymmetrical profiles whereas the image of the eye region gives substantially symmetrical profiles. This technique may be inserted between the steps S47 and S48 in FIG. 18 such that a positive result passes control to the step S48 whereas a negative result passes control to the step S40.

Detection of the omega shape reduces the chances of false face detection but further tests may be performed, for instance as illustrated by the steps S35 and S36 in FIG. 15, so as to reduce still further the chances of false detections. Detection of the omega shape allows the middle of a face to be located, assuming that a face is present in the image. The eye regions are usually darker so that two brightness minima should be present and should be substantially horizontally symmetrically disposed with respect to the middle line. This may be tested with respect to the RGB domain but does not need to be applied at the full image resolution. In fact, a lower image resolution may have the advantage of reducing the chances of any isolated dark pixel from being taken as the minimum corresponding to an eye.

Figure 21:
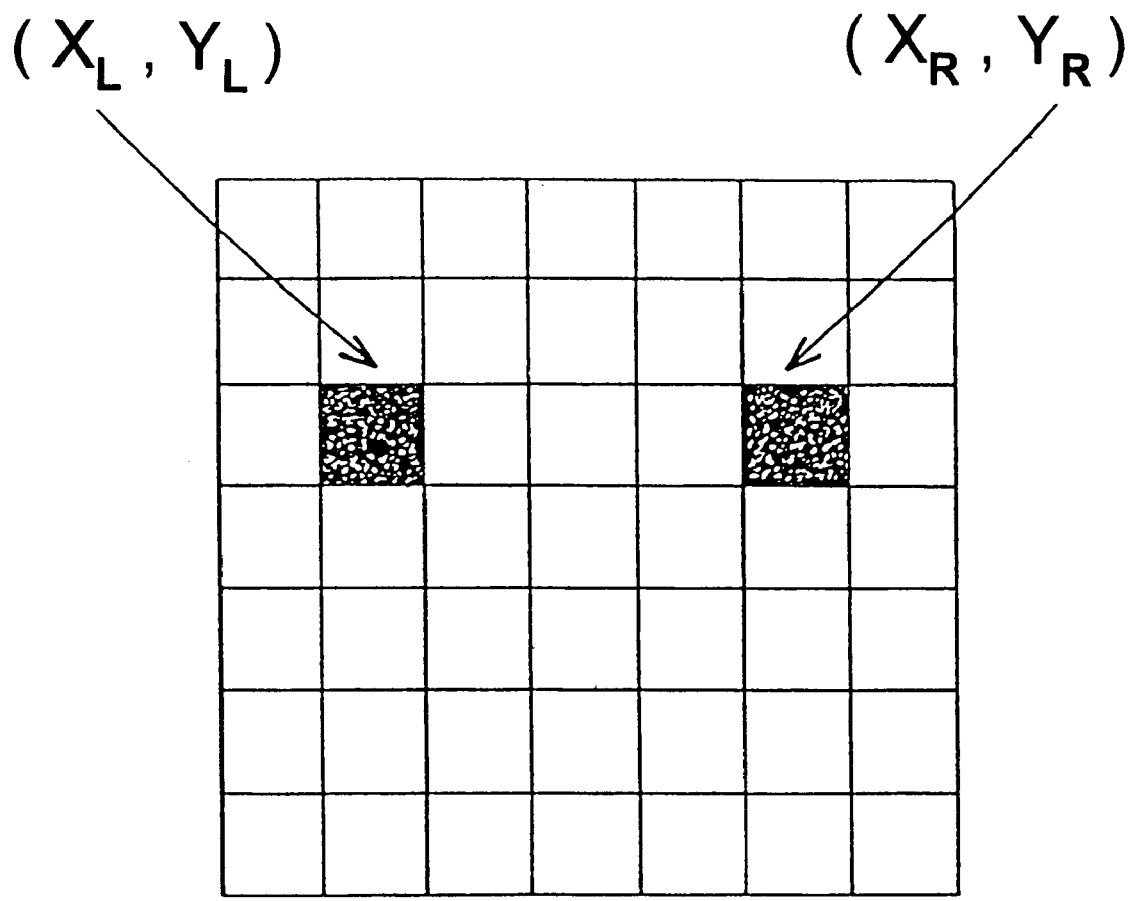
FIG. 21 illustrates detection of a pair of eyes represented as a pair of brightness minima.

Although the head of a user will normally be in a substantially upright position during the initialisation stage, an absolutely upright position is not essential. Thus, the two minima do not necessarily lie on the same horizontal line. It is therefore useful to reduce the image resolution by averaging, for instance as described hereinbefore. A single colour component image, such as the red component image, is sufficient for this purpose. A suitable resolution for this test is such that the target image contains only a few pixels in each dimension, for example 5 by 5 or 7 by 7 pixels. As illustrated in FIG. 21, the locations of the minima are represented as $(X_L, Y_L)$ and $(X_R, X_R)$. The a step S35 determines whether $$Y_L = Y_R$$

and $$|X_L + X_R - 2X_0| \leq T_4$$

where $X_0$ is the centre position and $T_4$ is a threshold, for instance having a value of 1.

Figure 22:
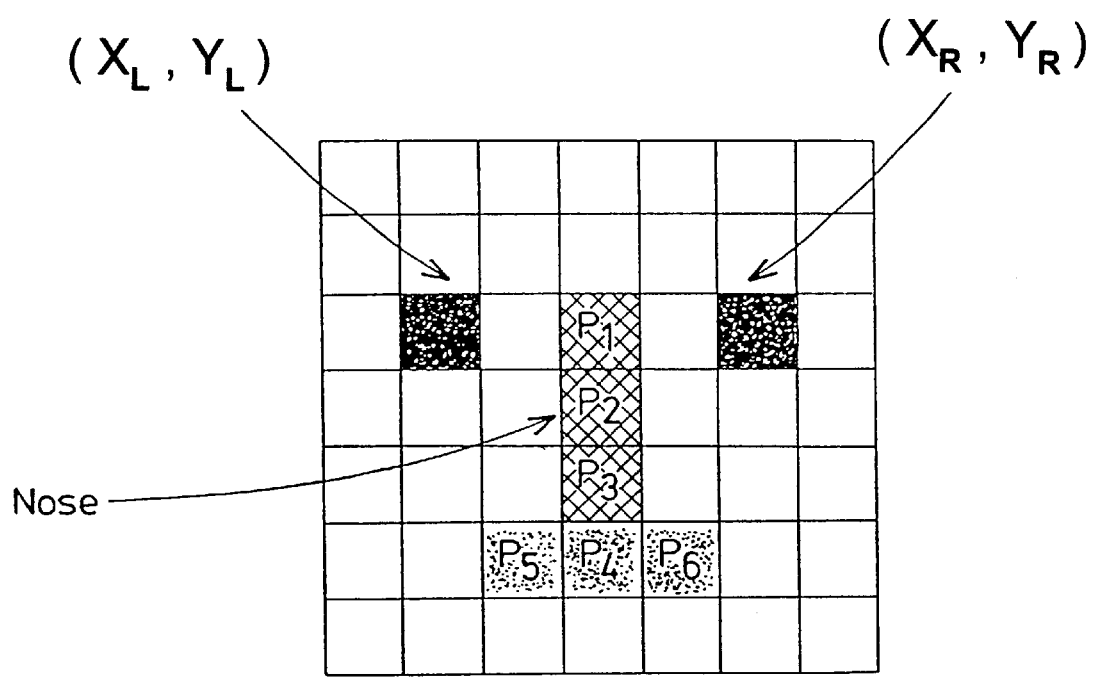
FIG. 22 illustrates a nose detection technique.

If the step S35 confirms the existence of two eye regions, the likelihood that these regions correspond to actual eyes in the image is enhanced if a brighter region is detected between the minima. A typical nose pattern is illustrated in FIG. 22 and represents the observation that the nose is usually brighter than the image just below the tip of the nose. The nose region as shown in FIG. 22 should have a length of two or three pixels depending on the actual size of the face. In this case, the nose region is accepted if the following conditions are satisfied:

$$\min(P_1, P_2, P_3)/\max(P_1, P_2, P_3) \geq T_5$$

and $$\mathrm{mean}(P_4, P_5, P_6)/\mathrm{mean}(P_1, P_2, P_3) \leq T_6$$

where $T_5$ and $T_6$ are predetermined thresholds and typically have values of 0.8 and 0.5, respectively.

Figure 23:
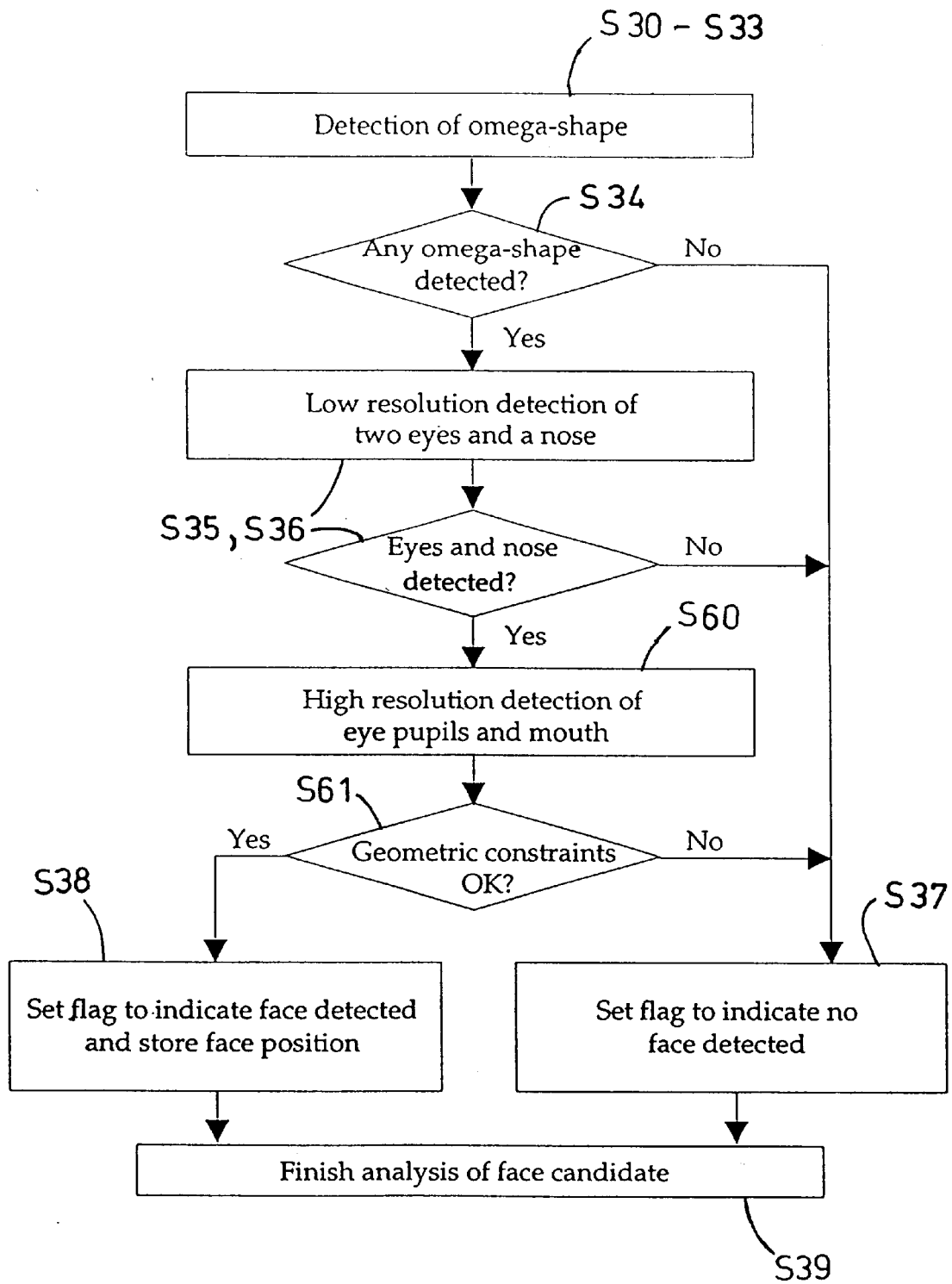
FIG. 23 is a flow diagram illustrating in more detail a modified facial feature extraction step of the method illustrated in FIG. 14.

The above methods for detecting eyes and nose are carried out in lower resolution to improve computing efficiency. Other facial feature extraction methods may be applied to further verify the presence of a face. For example, the following methods describe the detection of eye pupils and mouth lips using the original full resolution RGB image. FIG. 23 illustrates another embodiment of the step S12 of FIG. 14 in that steps S60 and S61 are added. The step S60 performs a high resolution detection of eye pupils and mouth and the step S61 performs a geometrical constraints test, both of which are described in more detail hereinafter.

The precise position of each eye may be identified as the centre of the eye pupil. The first step to determine the centre of the eye pupil is to segment the eye pupil from the rest of the eye region and the face skin. It has been found that the following inequality holds for the pixels over the eye region except those of the eye pupil:

$$R > G > B$$

The following equation is used to detect the eye pupil:

$$E(x, y) = \begin{cases} 0 & R - G > C_1 \text{ and } G - B > C_2 \\ 1 & \text{otherwise} \end{cases}$$

where the value 1 denotes a pixel inside the eye pupil region and 0 a pixel outside, and where $C_1$ and $C_2$ are two constants. Typcial values of these two parameters are given by:

$$C_1 = C_2 = 0$$

Figure 24:
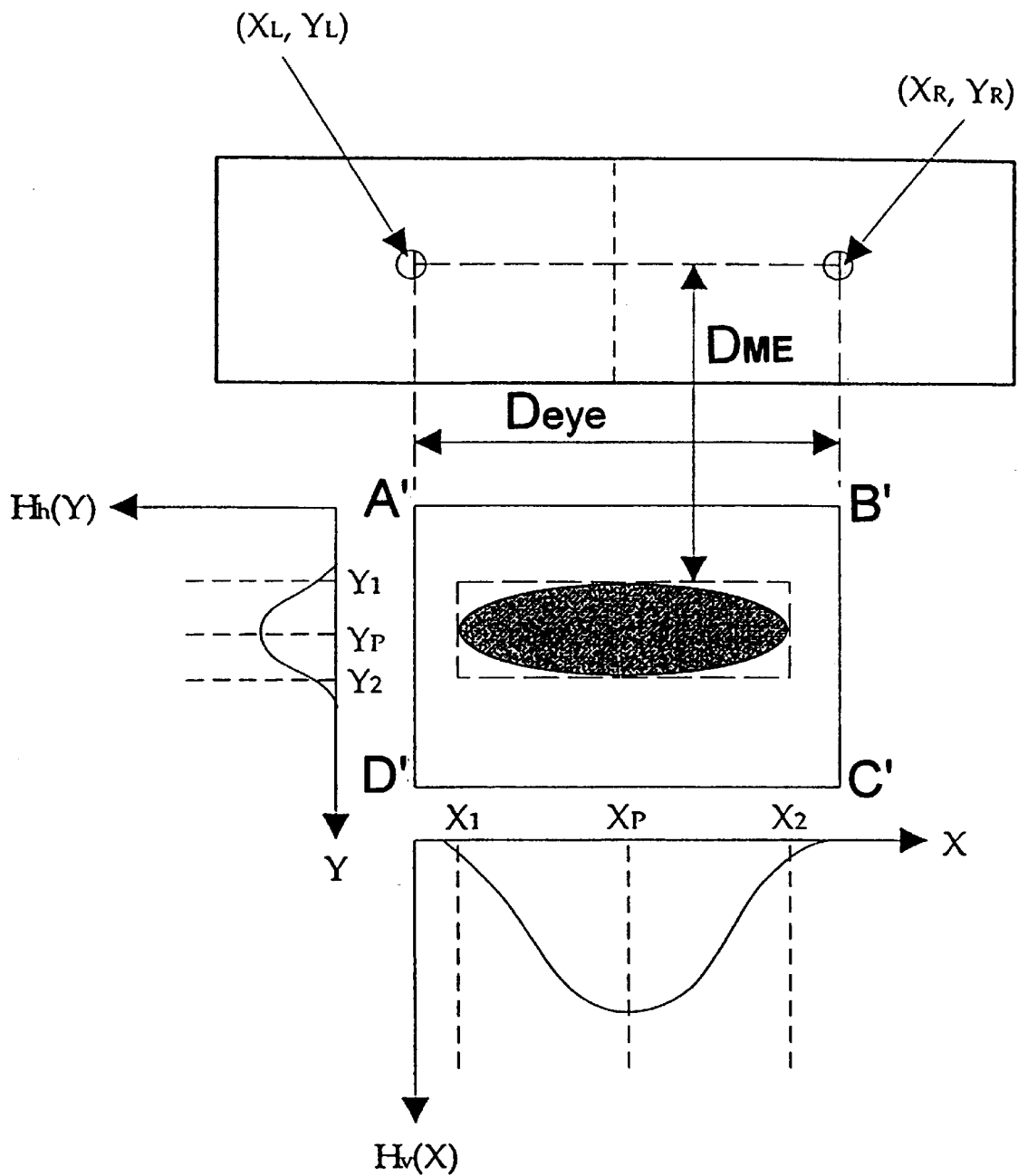
FIG. 24 illustrates eye pupil and mouth regions with vertical and horizontal integral projections of the mouth region.

The initial best eye template position is given by the location where the best omega-shape is detected as described earlier. The peak position of the omega-shape divides this region into two halves. The above eye pupil detection method may then be applied to each half separately. The eye positions are then defined as the centroids of the detected eye pupils. For example, the left eye position is given by:

$$X_L = \frac{1}{N} \sum_{y=y_1}^{y_2} \sum_{x=x_1}^{x_2} x \cdot E(x, y) \quad \text{and:}$$

$$Y_L = \frac{1}{N} \sum_{y=y_1}^{y_2} \sum_{x=x_1}^{x_2} y \cdot E(x, y)$$

where N is the total number of pixels in the area whose top-left corner is at $(x_1,y_1)$ and whose bottom-right corner is at $(x_2,y_2)$. The position $(X_L,Y_L)$ then defines the centre of the left eye pupil. Similarly the position of the right eye pupil can be determined as $(X_R,Y_R)$. This is illustrated in FIG. 24. The eye separation is then given by:

$$D_{eye} = X_R - X_L$$

If the eye pupils are detected, the mouth may then be located within the rectangular area A'B'C'D' as illustrated in FIG. 24. The left side of this area A'B'C'D' is determined by the position of the left eye pupil and the right side by that of the right eye pupil. The top side of the area is located $0.5D_{eye}$ below the line linking the two eye pupils and the bottom side is located $1.5D_{eye}$ below the same line.

The detection of the mouth is achieved by detecting the lips. The lips are segmented from the face using the following equation:

$$M(x, y) = \begin{cases} 1 & R > G > B \text{ and } R < \eta G \\ 0 & \text{otherwise} \end{cases}$$

where the value 1 denotes a lip pixel and 0 a skin pixel, and where n is a constant whose typical value is set to 2.5.

A vertical histogram is then constructed using the following equation:

$$H_v(x) = \sum_{y=y_1}^{y_2} M(x, y)$$

This is illustrated in FIG. 24. If the mouth does exist, the above histogram would usually produce a peak at the centre and decrease gradually on both sides. If a peak is detected at position $X_p$, the left end of the mouth is given by the first $X_1$ at which the value of histogram satifies the following inequality:

$$H_y(X_1) < \mu H_y(X_p)$$

Where $\mu$ is a constant and is typically set to 0.1. The right end of the mouth is similarly determined as $X_2$.

The height of the mouth is determined similarly using a horizontal projection profile of M(x,y). This gives the top position of the mouth as $Y_1$ and the bottom as $Y_2$. The mouth is therefore enclosed by the rectangle whose top-left corner is $(X_1, Y_1)$ and whose bottom right corner is $(X_2, Y_2)$.

If a mouth is present, its aspect ratio should satisfy the following geommetrical constraints:

$$\alpha \le \left| \frac{X_2 - X_1}{Y_2 - Y_1} \right| \le \beta$$

where $\alpha$ is typically set to 1.5 and $\beta$ to 5.

The vertical distance between the top of the mouth and the line linking the two eyes is defined as:

$$D_{ME} = Y_1 - (Y_L + Y_R)/2$$

The value of $Y_2$, that is the position of the lower lip, changes more significantly than the value of $Y_1$, that is the position of the top lip, in particular when the user is talking. In the above equation, $Y_1$ has been used to indicate the mouth position in the vertical direction.

It has been found that this distance is proportional to the eye separation, with a typical ratio of 1. The relative position of the mouth and the eyes therefore should satisfy the following condition:

$$\left| \frac{D_{ME}}{D_{eye}} - 1 \right| < v$$

where v is typically set to 0.25. The step S61 checks whether these geommetrical constraints are satisfied.

A further measure of symmetry may be based on a comprehensive symmetry detector as disclosed in D Reisfeld, H Wolfson and Y Yeshurun, "Context free attentional operators: the generalized symmetry transforms", IJCV, vol 14, pp. 119–130, 1995, and D Reisfeld and Y Yeshurun, "Robust detection of facial features by generalized symmetry," Proc of the $11^{th}$ IAPR International Conference on Pattern Recognition, pp. 117. Such a comprehensive arrangement is impratical for commercial implementation of the present method but a substantially simplified technique may be used to provide a measure of symmetry which assists in confirming the presence of a face or part of a face in a template.

Figure 25:
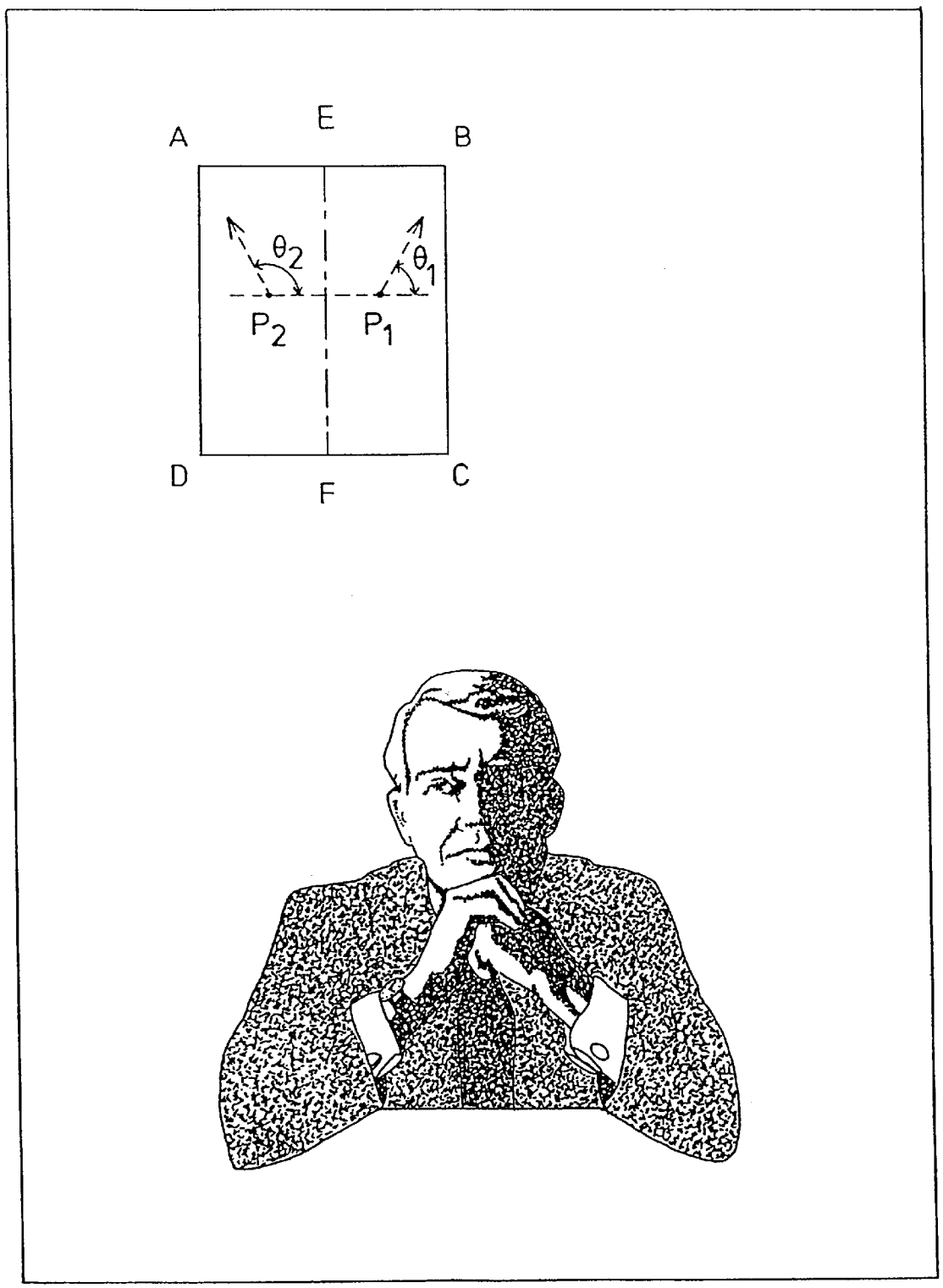
FIG. 25 illustrates a technique based on analysing facial symmetry.

FIG. 25 illustrates a side-lit image of a person and a rectangular area ABCD containing a subsection of the image. The subsection is divided into a left half AEFD and a right half EBCF. For any point $P_1$ in the right half, there is a corresponding point $P_2$ in the left half in the "mirror image" position. If the subsection ABCD contains a target which is symmetrical with respect to the middle line EF, the points $P_1$ and $P_2$ form a pair of symmetric points.

In absolutely uniform illumination, the brightness or intensity of these two points would be identical. However, as illustrated in FIG. 25, typical lighting conditions are such that the intensities of symmetric points are different.

This problem may be overcome by using "image gradients", which are vectors describing the intensity change at each point. In particular, each such vector has a magnitude equal to the maximum change in intensity from the point in any direction and a direction or angle such that the vector points in the direction of maximum itensity change. The gradient amplitude is also affected by the type of illumination but the phase angle is largely dependent on the geometric features of the face and is less affected by illumination. Thus, the points $P_1$ and $P_2$ are regarded as symmetric if their gradient angles $\theta_1$ and $\theta_2$ satisfy the following condition:

$$\theta_1 + \theta_2 = \pm \pi$$

The symmetric measure of the subsection ABCD is given by:

$$Ss = \sum_{\substack{(x,y) \in EBCF \\ (x,y) \in AEFD}} \{1 - \cos[\theta_1(x, y) + \theta_2(x', y')]\}$$

where (x,y) and (x',y') are the coordinates of the point pairs in the two halves of the image subsection.

This measure Ss may be calculated for any subsection in the image by searching from left to right and top to bottom. The section having the highest value of Ss is then selected as the area containing the image face.

The measure Ss may be further refined in accordance with the following expression:

$$Ss = \sum_{\substack{(x,y)\in EBCF \\ (x',y')\in AEFD}} \{1 - \cos[\theta_1(x,y) + \theta_2(x',y')]w(x,y)w(x',y')\}$$

where w(x,y) and w(x',y') are weight functions. For instance, the weight functions may be the gradient amplitude at each point so that strong edges contribute more to the value of Ss. In practice, a binery weight function may be used and may be formed by thresholding the gradient amplitude such that, if the gradient amplitude exceeds a given threshold, the weight function is set to 1 and, otherwise, the weight function is set to 0. The threshold may be made equal to half of the mean value of the gradient amplitude of the subsection.

It is desirable that the target image be captured from an upright position of the face. When, for example, a user sits down in front of a display and starts to look at the display, the system starts to locate the face and find the target image. The first target image which is detected may not be the best as the user may not be in the upright position. Thus, it may not be appropriate to select the first detected target image as the template, for instance for subsequent observer tracking.

Figure 26:
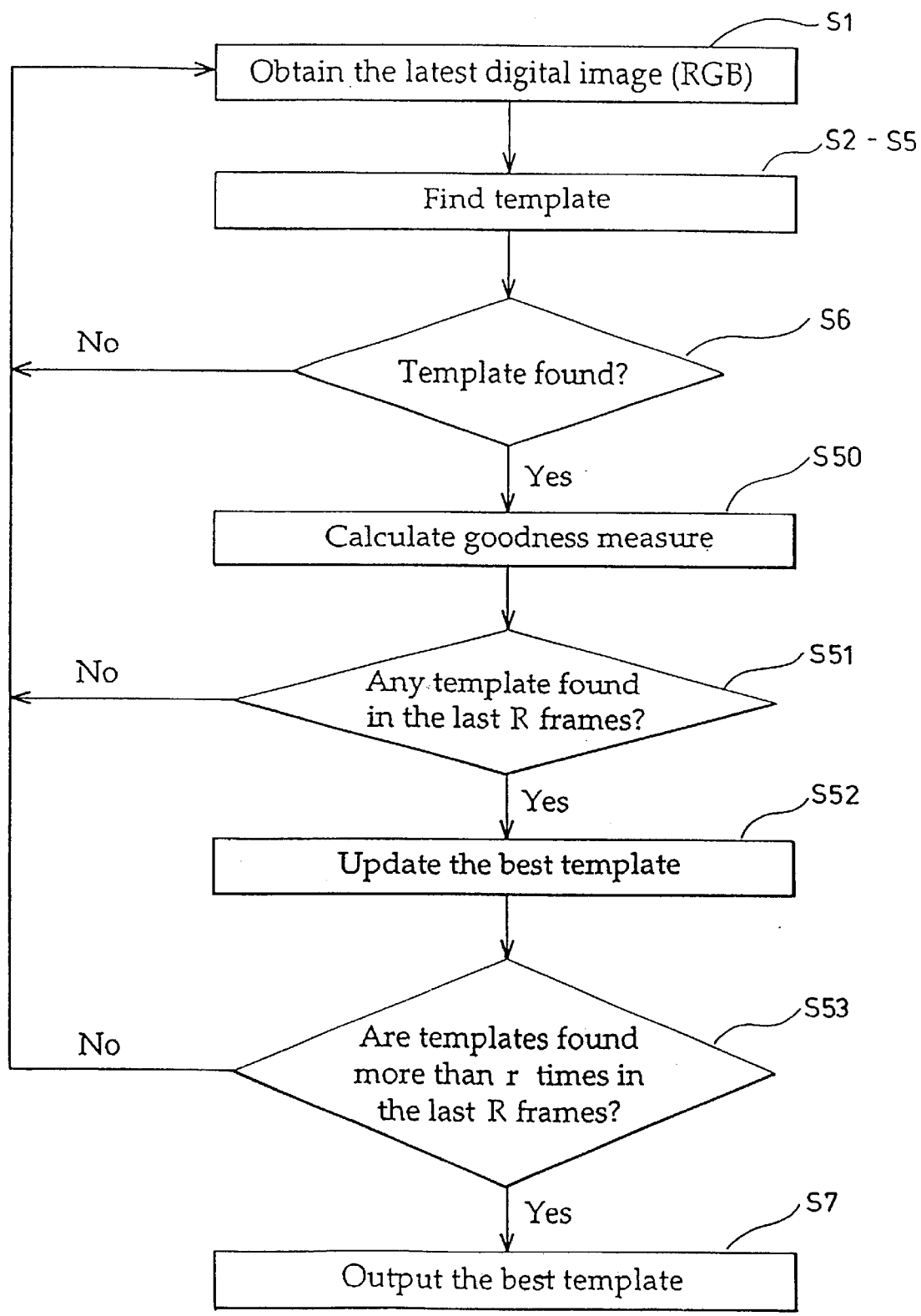
FIG. 26 is a flow diagram illustrating a technique for terminating the method illustrated in FIG. 14.

FIG. 26 illustrates a modified method based on that illustrated in FIG. 6. In particular, steps S50 to S53 are inserted between the steps S6 and S7. When a template is found in the step S6, the step S50 calculates the measure of the "goodness" of the image contained in the template. For instance, this measure may be based on the symmetric measure Ss as described hereinbefore. The step S51 determines whether the template has been found in the last R images or frames. If not, control returns to the step S1. If so, the step S52 compares the goodness measure of the most recently detected template with the previous best template. If the most recent template has a higher goodness value, it is selected as the current best template.

The step S53 determines whether templates have been found more than r times in the last R frames. If not, control returns to the step S1. If so, the step S7 outputs the best template i.e. that having the highest goodness measure.

The method illustrated in FIG. 26 thus determines whether more than r templates have been detected in the last R consequtive frames. For instance, r may be equal to 7 and R may be equal to 10. If this is the case, the target image is regarded as detected consistently and the best template is used for subsequent observer tracking.

It is possible for the face locator illustrated in FIG. 7 to be replaced by a semi-automatic method requiring some user assistance. For example, if a black-and-white video camera is used, colour information would not be available so that the face locator illustrated in FIG. 7 may no longer work.

In the semi-automatic method, each incoming video image is displayed with a graphics head guide about the same size as an adult head in the centre of the display. The user sees a live image sequence of himself with a fixed graphics guide so that he can position his head within the guide. The face analyser 18 is applied to the region within the graphics head guide and, once the head of the user is disposed within this region, detects the face and locates the precise position of the target image. There is no requirement for the user to have an accurate alignment, which is an inconvenient requirement in the method disclosed in GB 2 324 428 and EP 0 877 274. Also, the possibility of detecting false targets in the background is reduced because the face analyser 18 searches only in the area specified by the head guide.

If the lighting is very poor, for instance with extremely biased lighting, the semi-automatic method may not work reliably. In this case, the decision to accept the template may be left to the user rather than to the apparatus performing the method. For instance, this may be achieved by displaying a graphics overlay on top of the displayed image of the user after the target image is found. The user can see the position of the target image and can decide whether to accept the template.

The difference between this method and the manual method is that the user does not need to make a special effort to align his head with the "overlay" graphics in order to select the template. Instead, the computer suggests the template and, if this is correct, the user need only signal acceptance, for instance by pressing a button or key. Otherwise, the system may revert to the manual mode. This arragement ensures that a reliable template is always available to make successful tracking possible.

In ambient lighting where the face receives approximately the same illumination on both sides, detection of the omega shape in the vertical integral projection profile works well. However, when illumination is strongly biased to one side of the face, this technique may be less reliable but can be improved by supplying modified image data to the step S4 in FIG. 6 as follows.

The image in the image area is "mirrored" or reversed horizontally about the vertical centre line and then added back to the original image. In the ideal case where the face is geometrically symmetrical and the centre line is in the middle of the face, a resulting image of the face with symmetrical illumination on both sides is produced. The vertical integral projection profile of such an image then has an omega shape which is also symmetrical and the processing steps as described hereinbefore with reference to the face analyser 18 may be used on the modified image data.

The initial line of symmetry which is chosen may not be at the centre of the face. This technique may therefore be applied iteratively such that the detected peak in the profile is used as the mirror point, resulting in a better omega shape with a more precise peak position. This may be repeated until the peak position does not substantially change. Typically, such an iterative procedure requires fewer than ten iterations.

The method described hereinbefore works well with uniform lighting including ambient lighting and is applicable to applications under poor lighting conditions by using an active light source. Although the method does not require any special lighting and is very resilient to changes in the lighting of an observer, an active light source may be used during the initialisation stage 9 of FIG. 2 and then switched off during subsequent observer tracking, which is highly robust and does not require special lighting.

Figure 27:
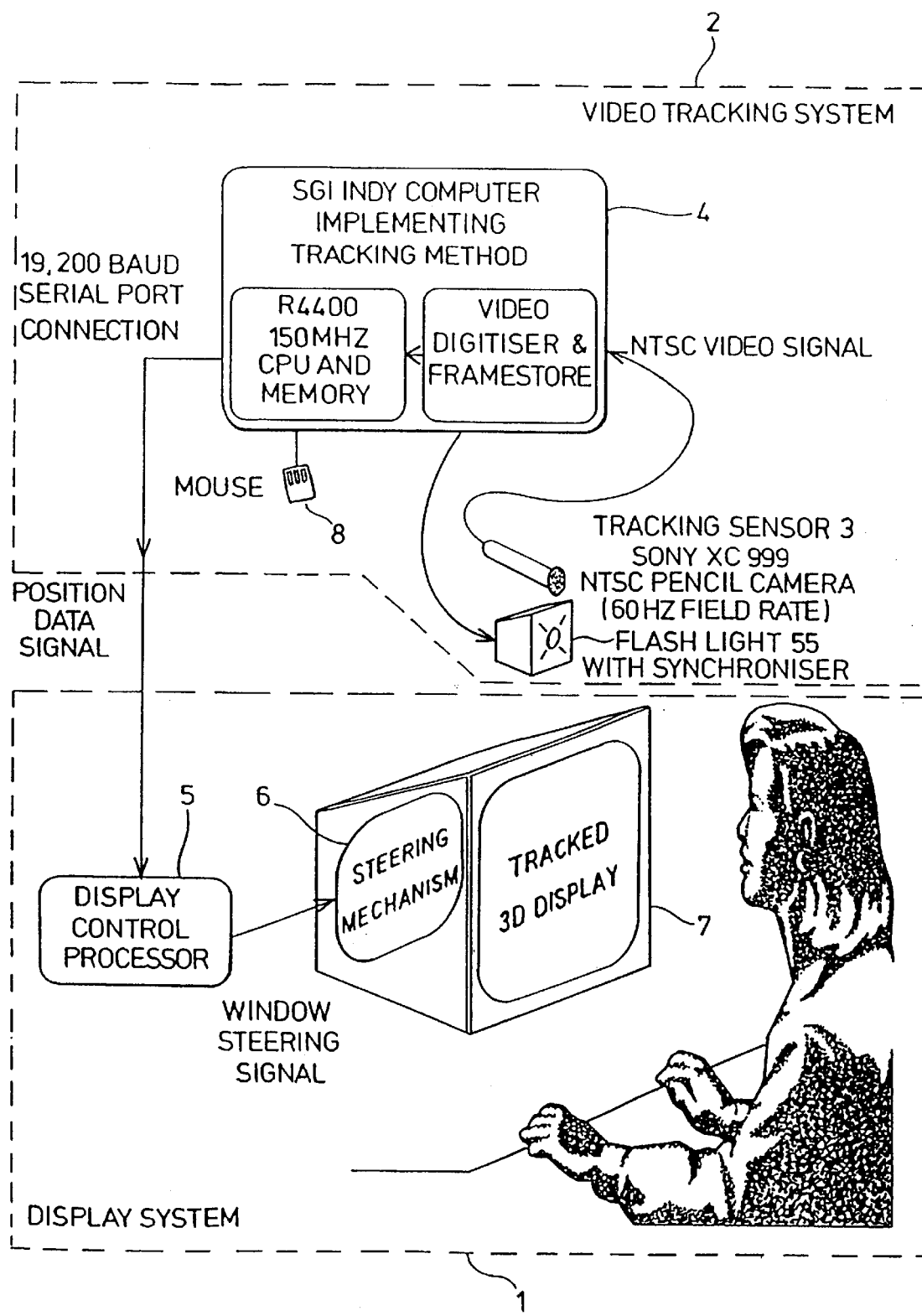
FIG. 27 is a block schematic diagram of an observer tracking display to which the present invention is applied.

FIG. 27 shows a display of the type shown in FIG. 2 modified to provide active lighting. The active light source comprises a flash light 55 with a synchroniser controlled by the processor 4. The flash light 55 is disposed in a suitable position, such as above the display 7 and adjacent the senor 3, for illuminating the face of an observer.

Figure 28:
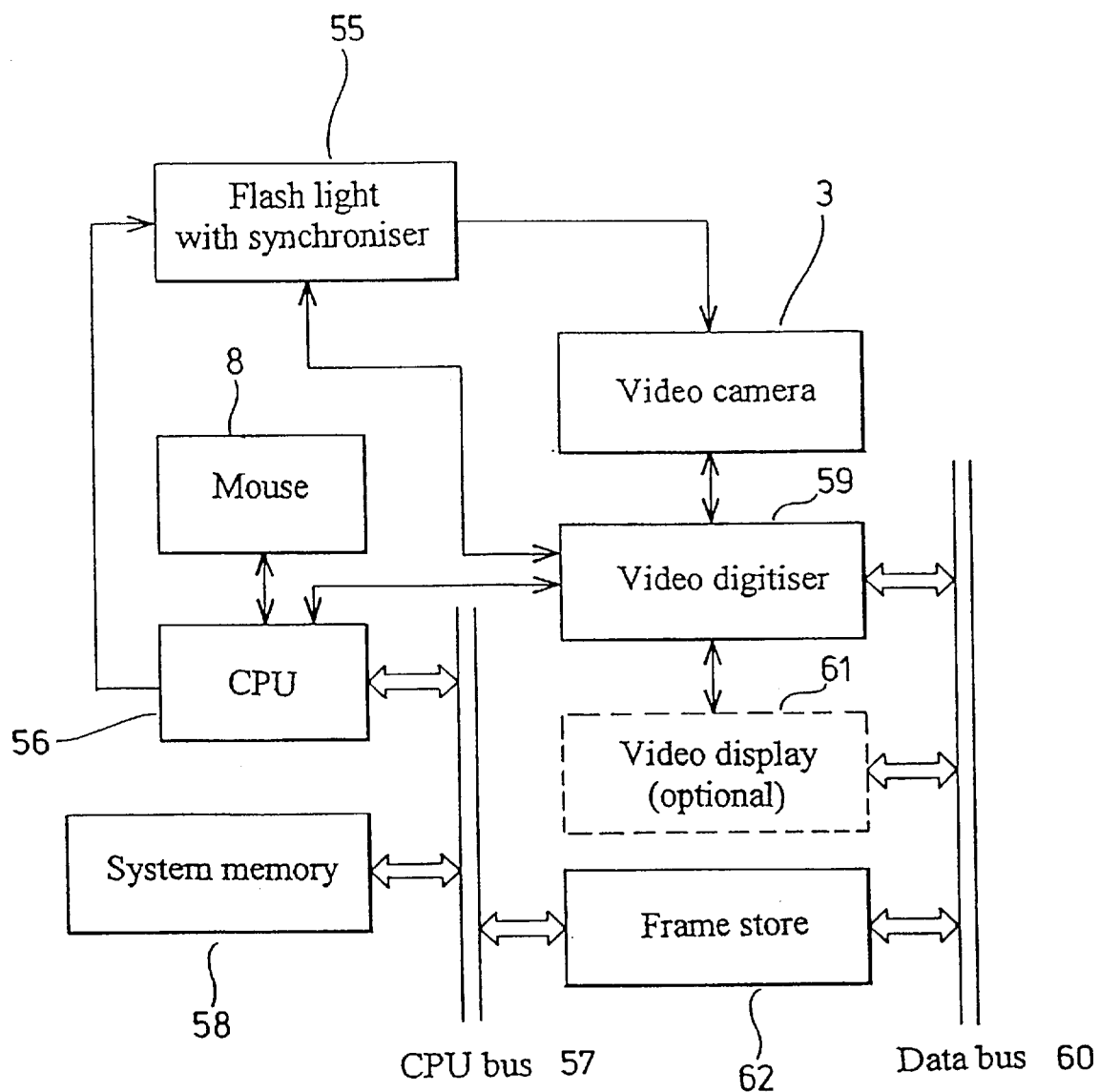
FIG. 28 is a system block diagram of a video tracking system of the display of FIG. 13 for performing the method of the invention.

FIG. 28 illustrates the video tracking system 2 and specifically the data processor 4 in more detail. The data processor comprises a central processing unit (CPU) 56 connected to a CPU bus 57. A system memory 58 is connected to the bus 57 and contains all of the system software for operating the data processor.

The video camera 3 is connected to a video digitiser 59 which is connected to a data bus 60, to the flash light with synchroniser 55, to the CPU 56 and to an optional video display 61 when provided. A frame store 62 is connected to the data bus 60 and the CPU bus 57. The mouse 8 is connected to the CPU 56.

For embodiments not using active lighting, the frame store need only have a capacity of one field. In the case of the video camera 3 described hereinbefore and having a field resolution of 640×240 pixels and for a 24 bit RGB colour signal, a capacity of 640×240×3 =460800 bytes is required. For embodiments using active lighting, the frame store 62 has a capacity of two fields of video data, ie: 921600 bytes.

In use, the flash light 55 is synchronised with the video camera 3 and with the video digitiser 59 so that the flash light is switched on or off at the appropriate time when an image is being captured.

The flash light 55 is used to flash light at the face of the observer so as to improve the uniformity of distribution. If the flash light 55 is much stronger than the ambient light, the intensity of the face is largely determined by the flash light 55. However, the use of a strong light source tends to produce an over-saturated image, in which many objects may be falsely detected as face-like regions. Further, the use of a powerful flashing light may become unpleasant to the observer and might cause damage to the eyes.

The flash light 55 should therefore be of mild intensity. In this case, the effects of ambient light may need to be reduced so as to improve the reliability of detecting genuine face-like regions.

The method illustrated in FIG. 6 may be modified so as to compare two consecutive frames of video image date in which one is obtained with the flash light 55 illuminated and the other is obtained with ambient light only. The first of these therefore contains the effect of both the ambient light and the flash light 55. This first image I (a+f) may therefore be considered to comprise two components:

$$I(a+f)=I(a)=I(f)$$

where I (a) is the ambient light-only image and I(f) is the image which would have been produced if the only light source where the flash light 55. This may be rewritten as:

$$I(f)=I(a+f)-I(a)$$

Thus, by subtracting the image pixel data, the effect of ambient lighting may be reduced or eliminated so as to improve the reliability and resilience of the face detection method.

What is claimed is:

1. A method of detecting a human face in an image, comprising locating in the image a candidate face region and analyzing the candidate face region for a first characteristic indicative of a facial feature, wherein the first characteristic comprises a substantially symmetrical horizontal brightness profile comprising a maximum disposed between first and second minima and in that the analyzing step comprises forming a vertical integral projection of a portion of the candidate face region and determining whether the vertical integral projection has first and second minima disposed substantially symmetrically about a maximum.

2. A method as claimed in claim 1, wherein the locating and analyzing steps are repeated for each image of a sequence of images.

3. A method as claimed in claim 1, wherein the image is a color image and the analyzing step is performed on a color component of the color image.

4. A method as claimed in claim 1, wherein the image is a color image and the analyzing step is performed on a contrast image derived from the color image.

5. A method as claimed in claim 1, wherein the analyzing step determines whether the vertical integral projection has first and second minima whose horizontal separation is within a predetermined range.

6. A method as claimed in claim 1, wherein the analyzing step determines whether the vertical integral projection has a maximum and first and second minima such that the ratio of the difference between the maximum and the smaller of the first and second minima to the maximum is greater than a first threshold.

7. A method as claimed in claim 6, wherein vertical integral projections are formed for a plurality of portions of the candidate face region and the portion having the highest ratio is selected as a potential target image.

8. A method as claimed in claim 1, wherein the analyzing step comprises forming a measure of the symmetry of the portion.

9. A method as claimed in claim 8, wherein the symmetry measure is formed as:

$$\sum_{x=0}^{x_0} |V(x_0+x)-V(x_0-x)|$$

where V(x) is the value of the vertical integral projection at horizontal position x and $x_0$ is the horizontal position of the middle of the vertical integral projection.

10. A method as claimed in claim 8, wherein the vertical integral projection is formed for a plurality of portions of the face candidate and the portion having the highest symmetry measure is selected as a potential target image.

11. A method as claimed in claim 1, wherein the analyzing step comprises dividing a portion of the candidate face region into left and right halves, forming a horizontal integral projection of each of the halves, and comparing a measure of horizontal symmetry of the left and right horizontal integral projections with a second threshold.

12. A method as claimed in claim 1, wherein the analyzing step determines whether the candidate face region has first and second brightness minima disposed at substantially the same height with a horizontal separation within a predetermined range.

13. A method as claimed in claim 12, wherein the analyzing step determines whether the candidate face region has a vertically extending region of higher brightness than and disposed between first and second brightness minima.

14. A method as claimed in claim 13, wherein the analyzing step determines whether the candidate face region has a horizontally extending region disposed below and of lower brightness than the vertically extending region.

15. A method as claimed in claim 1, wherein the analyzing step comprises locating, in the candidate face region, candidate eye pupil regions where a green image component is greater than a red image component or where a blue image component is greater than a green image component.

16. A method as claimed in claim 15, wherein locating the candidate eye pupil regions is restricted to candidate eye regions of the candidate face region.

17. A method as claimed in claim 16, wherein the analyzing step forms a function E(x,y) for picture elements (x,y) in the candidate eye regions such that:

$$E(x,y) = \begin{cases} 0 & \text{for } R-G > C_1 \text{ and } G-B > C_2 \\ 1 & \text{otherwise} \end{cases}$$

where R, G and B are red, green and blue image components, $C_1$ and $C_2$ are constants' E(x,y)=1 represents a picture element inside the candidate eye pupil regions and E(x,y)=0 represents a picture element outside the candidate eye pupil regions.

18. A method as claimed in claim 17, wherein the analyzing step detects the centers of the eye pupils as the centroids of the candidate eye pupil regions.

19. A method as claimed in claim 15, wherein the analyzing step comprises locating a candidate mouth region in a sub-region of the candidate face region which is horizontally between the candidate eye pupil regions and vertically below the level of the candidate eye pupil regions by between substantially half and substantially one and a half times the distance between the candidate eye pupil regions.

20. A method as claimed in claim 19, wherein the analyzing step forms a function M(x,y) for picture elements (x,y) within the sub-region such that:

$$M(x, y) = \begin{cases} 1 & \text{for } R > G > B \text{ and } R < \eta G \\ 0 & \text{otherwise} \end{cases}$$

where R, G and B are red, green and blue image components, η is a constant, M(x,y)=1 represents a picture element inside the candidate mouth region and M(x,y)=0 represents a picture element outside the candidate mouth region.

21. A method as claimed in claim 20, wherein vertical and horizontal projection profiles of the function M(x,y) are formed and a candidate lip region is defined in a rectangular sub-region where the vertical and horizontal projection profiles exceed first and second predetermined thresholds, respectively.

22. A method as claimed in claim 21, wherein the first and second predetermined thresholds are proportional to maxima of the vertical and horizontal projection profiles, respectively.

23. A method as claimed in claim 21, wherein the analyzing step checks whether the aspect ratio of the candidate lip region is between first and second predefined thresholds.

24. A method as claimed in claim 21, wherein the analyzing step checks whether the ratio of the vertical distance from the candidate eye pupil regions to the top of the candidate lip region to the spacing between the candidate eye pupil regions is between first and second preset thresholds.

25. A method as claimed in claim 1, wherein the analyzing step comprises dividing a portion of the candidate face region into left and right halves and comparing the angles of the brightness gradients of horizontally symmetrically disposed pairs of points for symmetry.

26. A method as claimed in claim 2, wherein the locating and analyzing steps are stopped when the first characteristic is found r times in R consecutive images of the sequence.

27. A method as claimed in claim 1, wherein the locating step comprises searching the image for a candidate face region having a second characteristic indicative of a human face.

28. A method as claimed in claim 27, wherein the second characteristic is uniform saturation.

29. A method as claimed in claim 28, wherein the searching step comprises reducing the resolution of the image by averaging the saturation to form a reduced resolution image and searching for a region of the reduced resolution image having, in a predetermined shape, a substantially uniform saturation which is substantially different from the saturation of the portion of the reduced resolution image surrounding the predetermined shape.

30. A method as claimed in claim 29, wherein the image comprises a plurality of picture elements and the resolution is reduced such that the predetermined shape is from two to three reduced resolution picture elements across.

31. A method as claimed in claim 30, wherein the image comprises a rectangular array of M by N picture elements, the reduced resolution image comprises (M/m) by (N/n) picture elements, each of which corresponds to m by n picture elements of the image, and the saturation P of each picture element of the reduced resolution image is given by:

$$P = (1/nm) \sum_{i=0}^{m-1} \sum_{j=0}^{n-1} f(i, j)$$

where f(i,j) is the saturation of the picture element of the ith column and the jth row of the m by n picture elements.

32. A method of claimed in claim 31, further comprising storing the saturations in a store.

33. A method as claimed in claim 31, wherein a uniformity value is ascribed to each of the reduced resolution picture elements by comparing the saturation of each of the reduced resolution picture elements with the saturation of at least one adjacent reduced resolution picture element.

34. A method as claimed in claim 33, wherein each uniformity value is ascribed a first value if (max(P)−min(P)/max(P)≦T where max(P) and min(P) are the maximum and minimum values, respectively, of the saturations of the reduced resolution picture element and the or each adjacent picture element and T is a threshold, and a second value different from the first value otherwise.

35. A method as claimed in claim 34, wherein T is substantially equal to 0.15.

36. A method as claimed in claim 33, further comprising storing the saturations in a store, wherein the or each adjacent reduced resolution picture element has not been ascribed a uniformity value and each uniformity value is stored in the store in place of the corresponding saturation.

37. A method as claimed in claim 34, wherein the resolution is reduced such that the predetermined shape is two or three reduced resolution picture elements across and wherein the method further comprises indicating detection of a candidate face region when a uniformity value of the first value is ascribed to any of one reduced resolution picture element, two vertically or horizontally adjacent reduced resolution picture elements and a rectangular two-by-two array of picture elements and when a uniformity value of the second value is ascribed to each surrounding reduced resolution picture element.

38. A method as claimed in claim 37, further comprising storing the saturations in a store, wherein detection is indicated by storing a third value different from the first and second values in the store in place of the corresponding uniformity value.

39. A method as claimed in claim 30, further comprising repeating the resolution reduction and searching at least once with the reduced resolution picture elements shifted with respect to the image picture elements.

40. A method as claimed in claim 29, wherein the saturation is derived from red, green and blue components as (max(R,G,B)−min(R,G,B))/max(R,G,B)

where max(R,G,B) and min(R,G,B) are the maximum and minimum values, respectively, of the red, green and blue components.

41. A method as claimed in claim 1, wherein a first image is captured while illuminating an expected range of positions of a face, a second image is captured using ambient light, and the second image is subtracted from the first image to form the image.

* * * * *